(12) United States Patent
Carter et al.

(10) Patent No.: US 10,755,538 B2
(45) Date of Patent: Aug. 25, 2020

(54) METAMATERIALS AND ACOUSTIC LENSES IN HAPTIC SYSTEMS

(71) Applicant: ULTRAHAPTICS LIMITED, Bristol (GB)

(72) Inventors: Thomas Andrew Carter, Bristol (GB); Benjamin John Oliver Long, Bristol (GB); Sriram Subramanian, Hove (GB)

(73) Assignee: Ultrahaptics iIP LTD, Bristol (GB)

( * ) Notice: Subject to any disclaimer, the term of this patent is extended or adjusted under 35 U.S.C. 154(b) by 286 days.

(21) Appl. No.: 15/671,107

(22) Filed: Aug. 7, 2017

(65) Prior Publication Data

US 2018/0047259 A1 Feb. 15, 2018

Related U.S. Application Data

(60) Provisional application No. 62/372,570, filed on Aug. 9, 2016, provisional application No. 62/438,637, filed
(Continued)

(51) Int. Cl.
*G08B 6/00* (2006.01)
*G10K 11/30* (2006.01)
(Continued)

(52) U.S. Cl.
CPC ............ *G08B 6/00* (2013.01); *G10K 11/1785* (2018.01); *G10K 11/22* (2013.01); *G10K 11/30* (2013.01); *G10K 15/00* (2013.01)

(58) Field of Classification Search
CPC ...... G08B 6/00; G10K 11/1785; G10K 15/00; G10K 11/30; G10K 11/22
See application file for complete search history.

(56) References Cited

U.S. PATENT DOCUMENTS 4,218,921 A 8/1980 Oran et al.
4,771,205 A 9/1988 Mequio
(Continued)

FOREIGN PATENT DOCUMENTS

CN 102591512 7/2012
CN 103797379 5/2014
(Continued)

OTHER PUBLICATIONS

Zhang, Shu, "Acoustic Metamaterial Design and Applications", Dissertation, Univ. of Illinois (Year: 2010).*
(Continued)

*Primary Examiner* — Ian J Lobo

(74) *Attorney, Agent, or Firm* — Koffsky Schwalb LLC; Mark I. Koffsky

(57) ABSTRACT

The properties of metamaterials are derived both from the inherent properties of their constituent materials and from the geometrical arrangement of those materials. Metamaterials may be stacked or otherwise manipulated to transform substantially monochromatic signal into a second signal having a desired amplitude and phase. Metamaterials may be used with acoustic devices to create haptic feedback with desired properties or to transform the shape of certain devices. Metamaterials may be used in rotating devices with openings that transform a monochromatic signal into a non-monochromatic signal.

14 Claims, 20 Drawing Sheets

Related U.S. Application Data on Dec. 23, 2016, provisional application No. 62/517,406, filed on Jun. 9, 2017, provisional application No. 62/538,064, filed on Jul. 28, 2017.

(51) Int. Cl.
*G10K 15/00* (2006.01)
*G10K 11/178* (2006.01)
*G10K 11/22* (2006.01)

(56) References Cited

U.S. PATENT DOCUMENTS

| | | | |
|---|---|---|---|
| 4,881,212 A | 11/1989 | Takeuchi | |
| 5,329,682 A | 7/1994 | Thurn | |
| 5,426,388 A | 6/1995 | Flora et al. | |
| 5,511,296 A | 4/1996 | Dias | |
| 6,503,204 B1 | 1/2003 | Sumanaweera et al. | |
| 6,647,359 B1 | 11/2003 | Verplank | |
| 6,772,490 B2 | 8/2004 | Toda | |
| 6,800,987 B2 | 10/2004 | Toda | |
| 7,109,789 B2 | 9/2006 | Spencer | |
| 7,225,404 B1 | 5/2007 | Zilles et al. | |
| 8,269,168 B1* | 9/2012 | Axelrod | H01Q 15/0086 |
| | | | 250/336.1 |
| 8,279,193 B1 | 10/2012 | Birnbaum | |
| 8,607,922 B1 | 12/2013 | Werner | |
| 8,833,510 B2* | 9/2014 | Koh | F16F 15/02 |
| | | | 181/207 |
| 8,884,927 B1 | 11/2014 | Cheatham, III | |
| 9,208,664 B1 | 12/2015 | Peters et al. | |
| 9,612,658 B2 | 4/2017 | Subramanian | |
| 9,662,680 B2 | 5/2017 | Yamamoto | |
| 9,841,819 B2 | 12/2017 | Carter | |
| 9,945,818 B2 | 4/2018 | Ganti | |
| 10,101,811 B2 | 10/2018 | Carter | |
| 2002/0149570 A1 | 10/2002 | Knowles | |
| 2003/0024317 A1 | 2/2003 | Miller | |
| 2003/0144032 A1 | 7/2003 | Brunner et al. | |
| 2004/0014434 A1 | 1/2004 | Haardt | |
| 2004/0091119 A1 | 5/2004 | Duraiswami et al. | |
| 2004/0226378 A1 | 5/2004 | Oda | |
| 2004/0264707 A1 | 12/2004 | Yang | |
| 2005/0212760 A1 | 9/2005 | Marvit | |
| 2006/0085049 A1 | 4/2006 | Cory et al. | |
| 2006/0091301 A1 | 5/2006 | Trisnadi | |
| 2007/0177681 A1 | 8/2007 | Choi et al. | |
| 2008/0012647 A1 | 1/2008 | Risbo et al. | |
| 2008/0273723 A1 | 11/2008 | Hartung et al. | |
| 2008/0300055 A1 | 12/2008 | Lutnick | |
| 2009/0093724 A1 | 4/2009 | Pernot et al. | |
| 2010/0013613 A1 | 1/2010 | Weston | |
| 2010/0085168 A1 | 4/2010 | Kyung | |
| 2010/0103246 A1 | 4/2010 | Schwerdtner | |
| 2010/0109481 A1 | 5/2010 | Buccafusca | |
| 2010/0262008 A1 | 10/2010 | Roundhill | |
| 2011/0051554 A1 | 3/2011 | Varray et al. | |
| 2011/0199342 A1 | 8/2011 | Vartanian et al. | |
| 2011/0310028 A1 | 12/2011 | Camp, Jr. | |
| 2012/0063628 A1 | 3/2012 | Rizzello | |
| 2012/0223880 A1 | 9/2012 | Birnbaum | |
| 2012/0229401 A1 | 9/2012 | Birnbaum et al. | |
| 2012/0299853 A1 | 11/2012 | Dagar | |
| 2012/0307649 A1 | 12/2012 | Park et al. | |
| 2012/0315605 A1 | 12/2012 | Cho | |
| 2013/0035582 A1 | 2/2013 | Radulescu | |
| 2013/0100008 A1 | 4/2013 | Marti | |
| 2013/0101141 A1 | 4/2013 | McElveen | |
| 2014/0027201 A1* | 1/2014 | Islam | G10K 11/172 |
| | | | 181/294 |
| 2014/0168091 A1 | 6/2014 | Jones | |
| 2014/0265572 A1 | 9/2014 | Siedenburg | |
| 2015/0002477 A1 | 1/2015 | Cheatham, III | |
| 2015/0006645 A1 | 1/2015 | Oh | |
| 2015/0007025 A1 | 1/2015 | Sassi | |
| 2015/0066445 A1 | 3/2015 | Lin et al. | |
| 2015/0070147 A1 | 3/2015 | Cruz-Hernandez et al. | |
| 2015/0070245 A1 | 3/2015 | Han et al. | |
| 2015/0110310 A1 | 4/2015 | Minnaar | |
| 2015/0013023 A1 | 5/2015 | Harris et al. | |
| 2015/0130323 A1 | 5/2015 | Harris | |
| 2015/0168205 A1 | 6/2015 | Lee | |
| 2015/0192995 A1 | 7/2015 | Subramanian et al. | |
| 2015/0220199 A1 | 8/2015 | Wang | |
| 2015/0226537 A1 | 8/2015 | Schorre | |
| 2015/0226831 A1 | 8/2015 | Nakamura et al. | |
| 2015/0248787 A1 | 9/2015 | Abovitz | |
| 2015/0277610 A1 | 10/2015 | Kim | |
| 2015/0304789 A1 | 10/2015 | Babyoff | |
| 2016/0019879 A1* | 1/2016 | Daley | G10K 11/04 |
| | | | 181/207 |
| 2016/0044417 A1 | 2/2016 | Clemen | |
| 2016/0249150 A1 | 3/2016 | Carter et al. | |
| 2016/0124080 A1 | 5/2016 | Carter | |
| 2016/0189702 A1 | 6/2016 | Blanc et al. | |
| 2016/0242724 A1 | 8/2016 | Lavallee | |
| 2016/0246374 A1 | 8/2016 | Carter | |
| 2016/0320843 A1 | 11/2016 | Long | |
| 2017/0004819 A1 | 1/2017 | Ochiai | |
| 2017/0018171 A1 | 1/2017 | Carter | |
| 2017/0123499 A1 | 5/2017 | Eid | |
| 2017/0193768 A1 | 7/2017 | Long | |
| 2017/0193823 A1 | 7/2017 | Jiang | |
| 2018/0039333 A1 | 2/2018 | Carter | |
| 2018/0304310 A1 | 10/2018 | Long | |
| 2018/0361174 A1 | 12/2018 | Radulescu | |

FOREIGN PATENT DOCUMENTS

| | | |
|---|---|---|
| CN | 103984414 A | 8/2014 |
| EP | 1911530 A1 | 4/2008 |
| GB | 2464117 | 4/2010 |
| GB | 2513884 | 11/2014 |
| GB | 2513884 A | 11/2014 |
| GB | 2530036 | 3/2016 |
| JP | 2010109579 | 5/2010 |
| JP | 2011172074 | 9/2011 |
| JP | 201248378 | 3/2012 |
| JP | 2016035646 | 3/2016 |
| KR | 20120065779 | 6/2012 |
| KR | 20130055972 | 5/2013 |
| KR | 20160008280 | 1/2016 |
| WO | 1991/18486 | 11/1991 |
| WO | 96/39754 | 12/1996 |
| WO | 2005/017965 | 2/2005 |
| WO | 2013/179179 | 12/2013 |
| WO | 2014181084 | 11/2014 |
| WO | 2015006467 | 1/2015 |
| WO | 2015/039622 | 3/2015 |
| WO | 2016007920 | 1/2016 |
| WO | 2016132141 A1 | 8/2016 |
| WO | 2016132144 | 8/2016 |
| WO | 2016132144 A1 | 8/2016 |
| WO | 2016137675 | 9/2016 |
| WO | 2016/162058 | 10/2016 |

OTHER PUBLICATIONS

Notice of Allowance dated Dec. 19, 2018 for U.S. Appl. No. 15/665,629 (pp. 1-9).
Notice of Allowance dated Dec. 21, 2018 for U.S. Appl. No. 15/983,864 (pp. 1-7).
Ex Parte Quayle Action dated Dec. 28, 2018 for U.S. Appl. No. 15/966,213 (pp. 1-7).
International Preliminary Report on Patentability and Written Opinion issued in corresponding PCT/US2017/035009, dated Dec. 4, 2018, 8 pages.
Notice of Allowance dated Feb. 7, 2019 for U.S. Appl. No. 15/851,214 (pp. 1-7).
Office Action dated Feb. 20, 2019 for U.S. Appl. No. 15/623,516 (pp. 1-8).
Lang, Robert, "3D Time-of-Flight Distance Measurement with Custom Solid-State Image Sensors in CMOS/CCD—Technology",

(56) References Cited

OTHER PUBLICATIONS

A dissertation submitted to Department of EE and CS at Univ. of Siegen, dated Jun. 28, 2000, 223 pages.
Gokturk, et al., "A Time-of-Flight Depth Sensor-System Description, Issues and Solutions," Published in: 2004 Conference on Computer Vision and Pattern Recognition Workshop, Date of Conference: Jun. 27-Jul. 2, 2004, 9 pages.
Li, Larry, "Time-of-Flight Camera—An Introduction," Texas Instruments, Technical White Paper, SLOA190B—Jan. 2014 Revised May 2014, 10 pages.
Teixeira, et al., "A brief introduction to Microsoft's Kinect Sensor," Kinect, 26 pages., retrieved Nov. 2018.
Zeng, Wejun, "Microsoft Kinect Sensor and Its Effect," IEEE Multimedia, Apr.-Jun. 2012, 7 pages.
Kolb, et al., "Time-of-Flight Cameras in Computer Graphics," Computer Graphics forum, vol. 29 (2010), No. 1, pp. 141-159.
Iddan, et al., "3D Imaging in the Studio (And Elsewhwere . . . " Apr. 2001, 3DV systems Ltd., Yokneam, Isreal, www.3dvsystems.com.il, 9 pages.
Krim, et al., "Two Decades of Array Signal Processing Research—The Parametric Approach", IEEE Signal Processing Magazine, Jul. 1996, pp. 67-94.
Schmidt, Ralph, "Multiple Emitter Location and Signal Parameter Estimation" IEEE Transactions of Antenna and Propagation, vol. AP-34, No. 3, Mar. 1986, pp. 276-280.
Meijster, A., et al., "A General Algorithm for Computing Distance Transforms in Linear Time," Mathematical Morphology and its Applications to Image and Signal Processing, 2002, pp. 331-340.
Colgan, A., "How Does the Leap Motion Controller Work?" Leap Motion, Aug. 9, 2014, 10 pages.
Definition of "Interferometry"according to Wikipedia, 25 pages., Retrieved Nov. 2018.
Definition of "Multilateration" according to Wikipedia, 7 pages., Retrieved Nov. 2018.
Definition of "Trilateration"according to Wikipedia, 2 pages., Retrieved Nov. 2018.
"Welcome to Project Soli" video, https://atap.google.com/#project-soli Accessed Nov. 30, 2018, 2 pages.
Sixth Sense webpage, http://www.pranavmistry.com/projects/sixthsense/ Accessed Nov. 30, 2018, 7 pages.
Damn Geeky, "Virtual projection keyboard technology with haptic feedback on palm of your hand," May 30, 2013, 4 pages.
Takahashi Dean: "Ultrahaptics shows off sense of touch in virtual reality", Dec. 10, 2016 (Dec. 10, 2016), XP055556416, Retrieved from the Internet: URL: https://venturebeat.com/2016/12/10/ultrahaptics-shows-off-sense-of-touch-in-virtual-reality/ [retrieved on Feb. 13, 2019] 4 pages.
PCT Partial International Search Report for Application No. PCT/GB2018/053404 dated Feb. 25, 2019, 13 pages.
Pompei, F.J. (2002), "Sound from Ultrasound: The Parametric Array as an Audible Sound Source", Massachusetts Institute of Technology.
Hasegawa, K. and Shinoda, H. (2013) "Aerial Display of Vibrotactile Sensation with High Spatial-Temporal Resolution using Large Aperture Airboume Ultrasound Phased Array", University of Tokyo.
Hoshi, T. et al. (2010), "Noncontrast Tactile Display Based on Radiation Pressure of Airbourne Ultrasound ", IEEE Transactions on Haptics, vol. 3, No. 3.
Yoshino, K. and Shinoda, H. (2013), "Visio Acoustic Screen for Contactless Touch Interface with Tactile Sensation", University of Tokyo.
Kamakura, T. and Aoki, K. (2006) "A Highly Directional Audio System using a Parametric Array in Air" WESPAC IX 2006.
Alexander, J. et al. (2011), "Adding Haptic Feedback to Mobile TV".
Carter, T. et al. (2013) "Ultrahaptics: Multi-point Mid-Air Haptic Feedback for Touch Surfaces" UIST.
Gavrilov, L.R. (2008) "The Possibility of Generating Focal Regions of Complex Configurations in Application to the Problems of Stimulation of Human Receptor Structures by Focused Ultrasound" Acoustical Physics, vol. 54, No. 2, pp. 269-278.
Search Report for GB1308274.8 dated Nov. 11, 2013.
Search Report for PCT/GB2014/051319 dated Jul. 28, 2014.
Gavrilov L R Et al (2000) "A theoretical assessment of the relative performance of spherical phased arrays for ultrasound surgery" Ultrasonics, Ferroelectrics, and Frequency Control, IEEE Transactions on (vol. 47, Issue: 1), pp. 125-139.
Mingzhu Lu et al. (2006) Design and experiment of 256-element ultrasound phased array for noninvasive focused ultrasound surgery, Ultrasonics, vol. 44, Supplement, Dec. 22, 2006, pp. e325-e330.
E.S. Ebbini et al. (1991), A spherical-section ultrasound phased array applicator for deep localized hyperthermia, Biomedical Engineering, IEEE Transactions on (vol. 38 Issue: 7), pp. 634-643.
Iwamoto et al. (2006), Two-dimensional Scanning Tactile Display using Ultrasonic Radiation Pressure, Symposium of Haptic Interfaces for Virtual Environment and Teleoperator Systems, pp. 57-61.
Iwamoto et al. (2008), Non-contact Method for Producing Tactile Sensation Using Airborne Ultrasound, EuroHaptics, pp. 504-513.
Search report for PCT/GB2015/052578 dated Oct. 26, 2015.
IPRP for PCT/GB20141/051319 dated Nov. 10, 2015.
Search Report for GB1415923.0 dated Mar. 11, 2015.
Marshall, M ., Carter, T., Alexander, J., & Subramanian, S. (2012). Ultratangibles: creating movable tangible objects on interactive tables. In Proceedings of the 2012 ACM annual conference on Human Factors in Computing Systems. (pp. 2185-2188).
Obrist et al., Talking about Tactile Experiences, CHI 2013, Apr. 27-May 2, 2013.
Long et al. Rendering Volumetric Haptic Shapes in Mid-Air using Ultrasound, ACM Transactions on Graphics (Proceedings of SIGGRAPH Asia), vol. 33, No. 6, Article 181.
Freeman et al., Tactile Feedback for Above-Device Gesture Interfaces: Adding Touch to Touchless Interactions ICMI'14, Nov. 12-16, 2014, Istanbul, Turkey.
Obrist et al., Emotions Mediated Through Mid-Air Haptics, CHI 2015, Apr. 18-23, 2015, Seoul, Republic of Korea.
Wilson et al., Perception of Ultrasonic Haptic Feedback on the Hand: Localisation and Apparent Motion, CHI 2014, Apr. 26-May 1, 2014, Toronto, Ontario, Canada.
Phys.org, Touchable Hologram Becomes Reality, Aug. 6, 2009, by Lisa Zyga.
Iwamoto et al., Airborne Ultrasound Tactile Display: Supplement, The University of Tokyo 2008.
Hoshi, T., Development of Aerial-Input and Aerial-Tactile-Feedback System, IEEE World Haptics Conference 2011, p. 569-573.
EPSRC Grant summary EP/J004448/1 (2011).
Hoshi, T., Handwriting Transmission System Using Noncontact Tactile Display, IEEE Haptics Symposium 2012 pp. 399-401.
Takahashi, M. et al., Large Aperture Airborne Ultrasound Tactile Display Using Distributed Array Units, SICE Annual Conference 2010 p. 359-62.
Hoshi, T., Non-contact Tactile Sensation Synthesized by Ultrasound Transducers, Third Joint Eurohaptics Conference and Symposium on Haptic Interfaces for Virtual Environment and Teleoperator Systems 2009.
Tom Nelligan and Dan Kass, Intro to Ultrasonic Phased Array.
Light, E.D., Progress in Two Dimensional Arrays for Real Time Volumetric Imaging, 1998.
Casper et al., Realtime Control of Multiple-focus Phased Array Heating Patterns Based on Noninvasive Ultrasound Thermography, IEEE Trans Biomed Eng. Jan. 2012 ; 59(1): 95-105.
Hoshi, T., Touchable Holography, SIGGRAPH 2009, New Orleans, Louisiana, Aug. 3-7, 2009.
Sylvia Gebhardt, Ultrasonic Transducer Arrays for Particle Manipulation.
Marshall et al., Ultra-Tangibles: Creating Movable Tangible Objects on Interactive Tables, CHI'12, May 5-10, 2012, Austin, Texas.
Marzo et al., Holographic acoustic elements for manipulation of levitated objects, Nature Communications DOI: 10.1038/ncomms9661 (2015).
Search report and Written Opinion of ISA for PCT/GB2015/050417 dated Jul. 8, 2016.

(56) References Cited

OTHER PUBLICATIONS

Search report and Written Opinion of ISA for PCT/GB2015/050421 dated Jul. 8, 2016.
Martinez-Graullera et al., 2D array design based on Fermat spiral for ultrasonic imaging, Ultrasonics 50 (2010) 280-89.
Search report and Written Opinion of ISA for PCT/GB2017/050012 dated Jun. 8, 2017.
Search Report for PCT/GB20171052332 dated Oct. 10, 2017.
Xu Hongyi et al, "6-DoF Haptic Rendering Using Continuous Collision Detection between Points and Signed Distance Fields", IEEE Transactions on Haptics, IEEE, USA, vol. 10, No. 2, ISSN 1939-1412, (Sep. 27, 2016), pp. 151-161, (Jun. 16, 2017).
Péter Tamás Kovács et al, "Tangible Holographic 3D Objects with Virtual Touch", Interactive Tabletops & Surfaces, ACM, 2 Penn Plaza, Suite 701 Newyork NY 10121-0701 USA, (Nov. 15, 2015), ISBN 978-1-4503-3899-8, pp. 319-324.
Search report for PCT/US2018/028966 dated Jul. 13, 2018 (43 pages).
Search report for PCT/GB2018/051061 dated Sep. 26, 2018 (17 pages).
EPO Office Action for EP16708440.9 dated Sep. 12, 2018 (7 pages).
International Preliminary Report on Patentability for Application No. PCT/EP2017/069569 dated Feb. 5, 2019, 11 pages.
Japanese Office Action (with English language translation) for Application No. 2017-514569, dated Mar. 31, 3019, 10 pages.
Notice of Allowance dated May 30, 2019 for U.S. Appl. No. 15/966,213 (pp. 1-9).
Office Action dated Apr. 18, 2019 for U.S. Appl. No. 16/296,127 (pp. 1-6).
Office Action dated Apr. 4, 2019 for U.S. Appl. No. 15/897,804 (pp. 1-10).
Office Action dated May 16, 2019 for U.S. Appl. No. 15/396,851 (pp. 1-7).
Steve Guest et al., "Audiotactile interactions in roughness perception", Exp. Brain Res (2002) 146:161-171, DOI 10.1007/s00221-002-1164-z, Accepted: May 16, 2002/ Published online: Jul. 26, 2002, Springer-Verlag 2002, (11 pages).
A. Sand, Head-Mounted Display with Mid-Air Tactile Feedback, Proceedings of the 21st ACM Symposium on Virtual Reality Software and Technology, Nov. 13-15, 2015.

M. Toda, New Type of Matching Layer for Air-Coupled Ultrasonic Transducers, IEEE Transactions on Ultrasonics, Ferroelectrics, and Frequency Control, vol. 49, No. 7, Jul. 2002.
E. Bok, Metasurface for Water-to-Air Sound Transmission, Physical Review Letters 120, 044302 (2018).
Search Report for PCT/GB/2017/053880 dated Mar. 21, 2018.
Search Report for PCT/GB/2017/053729 dated Mar. 15, 2018.
M. A.B. Andrade, Matrix method for acoustic levitation simulation, IEEE Transactions on Ultrasonics Ferroelectrics and Frequency Control, 58 n. 8 (2011).
M. Barmatz, Acoustic radiation potential on a sphere in plane, cylindrical, and spherical standing wave of fields, J. Acoustical Socirty, 77 No. 3 (1985).
Yang Ling, Phase-coded approach for controllable generation of acoustical vortices, J. Applied Physics 113, No. 15 (2013).
K. Jia, Dynamic properties of micro-particles in ultrasonic transportation using phase-controlled standing waves, J. Applied Physics 116, n. 16 (2014).
Kin Cheng et al., Computation of the Acoustic Radiation Force on a Sphere Based on the 3-D FDTD Method, IEEE Symposium 2010.
Corrected Notice of Allowability dated Jun. 21, 2019 for U.S. Appl. No. 15/966,213 (2 pages).
International Search Report and Written Opinion for Application No. PCT/GB2018/053739, dated Jun. 4, 2019, 16 pages.
Notice of Allowance dated Jul. 31, 2019 for U.S. Appl. No. 15/851,214 (pp. 1-9).
Notice of Allowance dated Jul. 31, 2019 for U.S. Appl. No. 16/296,127 (pp. 1-9).
Office Action dated Jul. 10, 2019 for U.S. Appl. No. 15/210,661 (pp. 1-12).
Office Action dated Jul. 26, 2019 for U.S. Appl. No. 16/159,695 (pp. 1-8).
Corrected Notice of Allowability dated Oct. 31, 2019 for U.S. Appl. No. 15/623,516 (pp. 1-2).
Extended European Search Report for Application No. EP19169929.7, dated Aug. 6, 2019, 7 pages.
International Search Report and Written Opinion for Application No. PCT/GB2019/050969, dated Jun. 13, 2019, 15 pages.
Office Action dated Aug. 22, 2019 for U.S. Appl. No. 16/160,862 (pp. 1-5).
Office Action dated Oct. 17, 2019 for U.S. Appl. No. 15/897,804 (pp. 1-10).
Office Action dated Oct. 7, 2019 for U.S. Appl. No. 15/396,851 (pp. 1-9).

\* cited by examiner

METAMATERIALS AND ACOUSTIC LENSES IN HAPTIC SYSTEMS

RELATED APPLICATIONS

This application claims the benefit of the following four U.S. Provisional patent applications, all of which are incorporated by reference in their entirety:
1) Ser. No. 62/372,570, filed on Aug. 9, 2016;
2) Ser. No. 62/438,637, filed on Dec. 23, 2016;
3) Ser. No. 62/517,406, filed on Jun. 9, 2016; and
4) Ser. No. 62/538,064, filed on Jul. 28, 2017.

FIELD OF THE DISCLOSURE

The present disclosure relates generally to improved techniques for the use of metamaterials and acoustic lenses along with acoustic transducers in haptic-based systems.

BACKGROUND

A continuous distribution of sound energy, referred to as an "acoustic field", may be used for a range of applications including haptic feedback in mid-air, parametric audio and the levitation of objects.

By defining one or more control points in space, the acoustic field can be controlled. Each point can be assigned a value equating to a desired amplitude at the control point. A physical set of transducers can then be controlled to create an acoustic field exhibiting the desired amplitude at the control points.

For this control to be effective there must be as many transducers as possible in order to create enough degrees of freedom for the acoustic field to asymptotically approach the desired configuration. However, from a commercial perspective, using individually actuated transducers is an expensive solution, prone to transducer element failure and variability. From this perspective, reducing the number of elements is preferred, leading to reductions in acoustic capabilities. Being able to reduce the number and complexity of the electrically actuated components, while being able to retain acoustic versatility, is therefore advantageous.

One set of solutions to achieve these goals is the use of metamaterial, which is a material that has artificially designed structural properties that change its physical behavior in ways that may be generally unavailable in existing materials. Metamaterials are used to control and manipulate light, sound, and many other physical phenomena. The properties of metamaterials are derived both from the inherent properties of their constituent materials and from the geometrical arrangement of those materials.

Furthermore, to create haptic feedback, an array of transducers is actuated to produce an ultrasonic acoustic field that then induces a haptic effect. It has been discovered through simulations and testing that for best effect the transducers must be positioned in non-uniform or irregular patterns. While this can be to some extent achieved for positioning during printed circuit board (PCB) assembly, arbitrary positioning raises the cost of the assembly process and reduces the transducer density possible. If there is a method to achieve this positioning of acoustic sources without resorting to complex and costly assembly processes, then there is a commercial advantage in such a method. By producing the metamaterial such that an irregular pattern is expressed, this can be achieved without requiring this extra assembly cost.

Furthermore, by focusing at a point, acoustic waves with increased power are created and can be used to generate a constant force. The force generated is small but naturally non-contact. Further applications of the non-contact forces may also lead to commercially viable devices.

Current designed metamaterials generally incorporate only static structure. By including structures that can be dynamically switched between states through time, the properties of the metamaterial can be modified on the fly. These changes can be affected such that the metamaterial and transducer system can behave as though the input signal has changed, without actually changing the input signal. This is equivalent to effectively modifying the acoustic wave after, rather than before, leaving the transducer element.

This allows for a further division of labor and the resultant efficiency and potential cost savings. This is achieved by using a single or few highly efficient and powerful sources to generate a (generally monochromatic) acoustic wave that is then modified by switching metamaterial elements which are integrated into the material. This behaves similarly to the a transducer array. In this way, together the acoustic source and each element of the metamaterial may work together as a transducing element, only now the waveform modifications are expressed by the actable metamaterial layer.

Accordingly, it is desirable to implement one or more of the above techniques to achieve the goal of more effective and efficient use of transducers in haptic systems.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
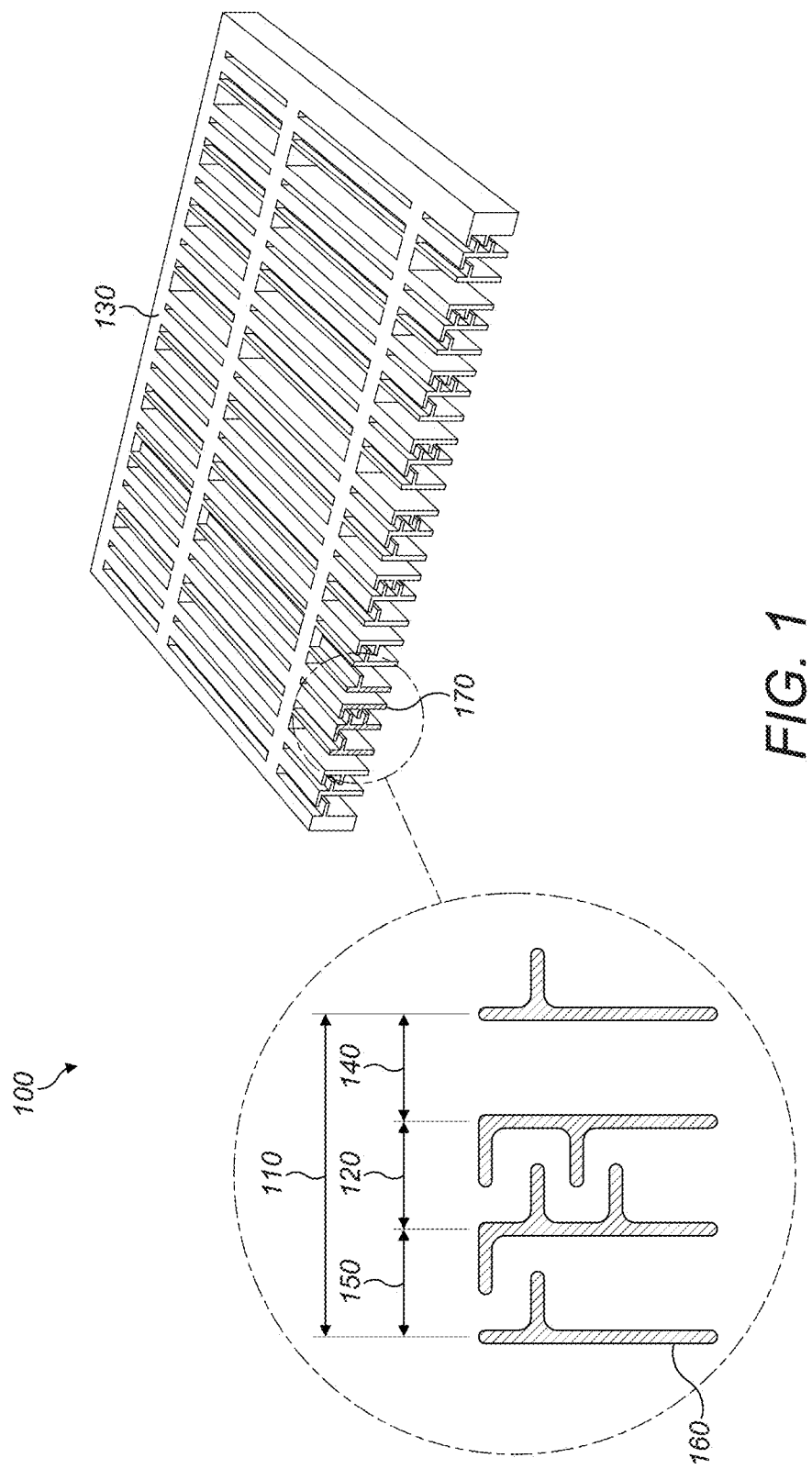
FIG. 1 is a metamaterial apparatus consisting of a composition of multiple metamaterials, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Described herein are certain techniques for improving the performance of haptic-based systems. These techniques may be used either alone or in various combinations.

I. Dynamic Control of Metamaterials

A. Dynamic Metamaterials

Though there are many structures that qualify as metamaterials, the most common is that of an arrangement of elements whose size and spacing is much smaller relative to the scale of spatial variation of the exciting field. With this limit, the responses of the individual elements, as well as their interactions, can often be incorporated (or homogenized) into continuous, effective material parameters; the collection of discrete elements is thus replaced conceptually by a hypothetical continuous material The advantage of this homogenization procedure is that sophisticated and complex materials can be engineered with properties beyond what is naturally available. For these purposes (creating acoustic fields) the propagation of the monochromatic wave through the material is the crucial property that requires manipulation. By changing the monochromatic wave, the phase offset of the acoustic wave is changed.

One such example of an acoustic metamaterial is a tortuous path material shown in FIG. 1. Shown in FIG. 1 is a metamaterial apparatus 100 consisting of a composition of multiple metamaterials 130. FIG. 1 further shows an inset 170 of an exemplary metamaterial cell 160 showing a tortuous or elongated path that an acoustic signal may take. By forcing the wave to either follow a shorter or longer path through the metamaterial cell 160, the propagation of the wave through the metamaterial cell 160 may be allowed straight through or impeded through the introduction of the longer path. As an example, the overall width of the metamaterial cell 160 may be 13 mm wide 110, with each of three sub-cells being 4.4 mm wide 150, 4.3 mm wide 120, and 4.4 mm wide 140.

Generally, acoustic metamaterial cells may be built to introduce different amplitude attenuations and phase offsets in the waves travelling through them. This can be interpreted as the multiplication of the wave phasor by a complex-valued transmission coefficient.

Figure 2:
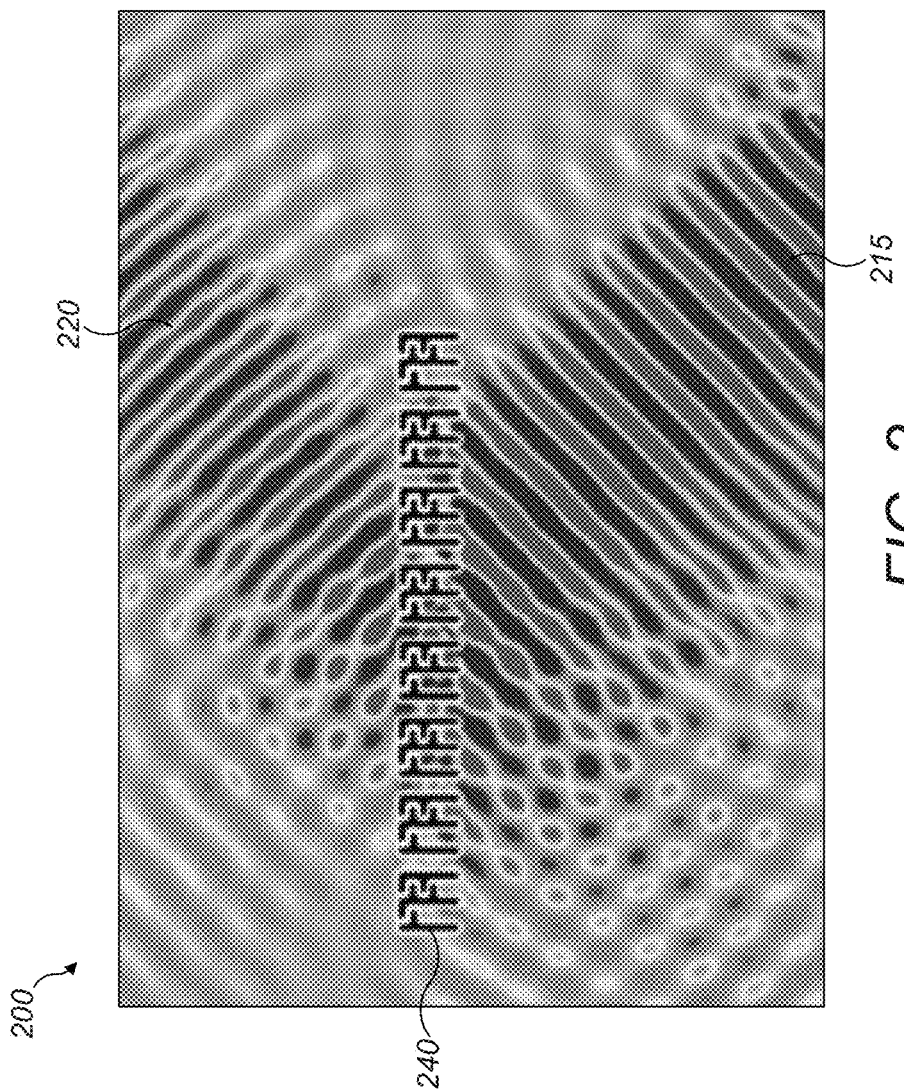
FIG. 2 is a two-dimensional simulation of an acoustic plane wave interacting with a metamaterial structure, in accordance with some embodiments.

FIG. 2 shows a two-dimensional simulation of an acoustic plane wave interacting with a metamaterial structure where the overall effect is to generate a negative refractive index. A plane wave 215, interacts with the acoustic material 240, to produce an exiting acoustic wave 220 in the opposite direction to that which would be expected of a material whose refractive index is positive. This is at odds with any natural bulk materials, and is due to the tortuous path metamaterial shown in which the acoustic waves follow different length paths to produce a subdivided plane wave which exits the material with different phase offsets. These interfere to produce the unnaturally refracted wave.

In a further step the acoustic metamaterial may then be made reconfigurable, by mechanically, electrically or magnetically actuating structural elements inside the cells to dynamically change their behavior. This results in different complex transmission coefficients being dynamically expressed in one or more alternate switchable states. In the example of the tortuous path metamaterial, the "teeth" in the cells may be actuated; moved to make the path shorter or longer. This results in a dynamically reconfigurable phase change while adding little in the way of amplitude change. An element produced in this way would change phase without changing amplitude in a significant way. A cell containing two layers of mesh that cross to provide a larger or smaller proportion of open space may describe a simple acoustic metamaterial that implements a different element that results in a controlled amplitude drop. Notably due to physical limitations, a manufactured implementation of such an element will likely result in change in both phase and amplitude for any given input frequency, regardless of the initial configuration of the material.

In discrete components, a Helmholtz resonator is a container of gas (usually air) with an open hole (or neck or port). A volume of air in and near the open hole vibrates because the elasticity of the air inside behaves in a way analogous to a spring. A common example is an empty bottle: the air inside vibrates when blown across the top, Similarly, the metamaterial may also be constructed with a Helmholtz resonator, which could be actuated by opening a hole in a chamber producing effectively an amplitude increase.

These actuated metamaterials enable the one or few basic transducer element(s) to be simple, with no amplitude or phase change required. The dynamic metamaterial achieves the modification of the incident acoustic wave into the phase offset and amplitude required to drive control points, points in the acoustic field that provide controlled pressure changes as the result of interfering waves. This frees the transducer element or elements to be electrically driven in a simple way, potentially even being very highly resonant. This is important because resonant devices are highly efficient, but resist changes in output vibration and would be slow to respond and difficult to control. In this case however, control is achieved externally to the transducer, rendering this difficult control unnecessary. As a result, the transducer may be built to be as resonant as possible, as the effect of increasingly long response times becomes less important.

B. Designing a Metamaterial

In order to create these effects, a monochromatic acoustic source is used, with the phase of the wavefront of the acoustic field manipulated. In existing devices this is achieved by manipulating the signals to individual transducer elements, which involves complicated processing and involved electronic design and fabrication. A method to apply the necessary phase manipulation without involved transducer signaling is commercially desirable.

Acoustic metamaterials may be designed using structure that is of the same scale as the features of the waves it is interacting with to take advantage of diffraction and interference behavior. These are then designed in order to create novel controlled effects. Ultrasonic waves in air are about the millimeter scale, which puts acoustic metamaterials in this regime easily in the range of simple manufacturing processes through plastics or other materials. These may then be used to influence the acoustic field around the object. In these situations, it is not necessary to place the acoustic source next to the metamaterial. The metamaterial may thus collect and focus incoming acoustic radiation passively into a region of space in order to do useful work such as a power source.

To design an effective metamaterial, the impedance of the material structure and its efficiency (the proportion of energy that is transmitted versus energy that is reflected) must be considered. One example of a metamaterial that has been designed and successfully fabricated is the tortuous path or labyrinthine structure. This provides close impedance matching to bulk air, which allows for high efficiency in the acoustic output.

C. Creating Foci

Acoustic metamaterials may be designed using these tortuous paths or labyrinthine features to manipulate the phase of incoming monochromatic sound. If the monochromatic sound is ultrasound and is amplitude-modulated at a frequency or group of frequencies that may be detected haptically and if it is focused to one or more points in space at once, these can be perceived by the sense of touch. If it is focused and amplitude-modulated at a frequency or group of frequencies that can be detected audibly, it can also be perceived by the sense of hearing as parametric audio. If it is focused and the time-averaged forces involve control, it can be used to levitate objects. A control point may allow for any combination of the foregoing. The acoustic metamaterials may change the phase of the wavefront and the frequency of the ultrasound is greater than any that might be contained in the modulated signal (so that the time lag involved in the metamaterial leaves them mostly unaffected). Then, the acoustic metamaterial may be designed in such a way as to create a focusing of the sound field, which may be off-axis and not symmetrical. This then simplifies the design of the emission of the sound field to a single element that can produce any wave using a single simple signal, which can then be corrected through the application of the metamaterial to create such a focus.

Alternatively, the array that controls individual transducer elements may be kept and the metamaterials then designed to accomplish the same function remotely. This modifies the acoustic field in the volume efficiently and separately from the individual signal control of the array. Further, if the array control is aware of the behavior of the metamaterial, the array may be configured to actuate the metamaterial remotely. This is much like redirecting a shining torch to point its beam at a lens. This may allow a single transducer array to create a series of foci in different positions or enhance the efficiency of an array in a given region of space.

D. Actuated Metamaterials

Acoustic metamaterials can be actuated through mechanistically or electrically modifying their structure in order to dynamically change the properties of the acoustic field. By changing the configuration of 'teeth' in a tortuous path metamaterial, the phase change incurred on a transported acoustic wave can be modified. In this way, multiple states can be encoded into the metamaterial in order to produce, for instance, a focus that moves from one place to another, or foci that change position such as moving forward and backward.

E. Stacking Metamaterials

These acoustic metamaterials can be stacked in order to modify the wavefront by passing the sound through two or more metamaterials. For example, the first metamaterial may provide focusing, while the second provides what form of phase singularity to use to levitate and impart angular momentum onto an object, or levitate and trap an object such that it is stationary. A further example might be a metamaterial that generates a focus, and then a further metamaterial that then 'cloaks' the focus by returning the wavefront to a planar or other configuration, which may also involve focusing or levitation.

F. Stacked Dynamic Metamaterials and Digital Phase Control

Metamaterial cells may be formed into a plate or "metasurface" that may then be individually designed to generate a particular complex transmission coefficient when a cell is actuated. Through the stacking of these plates into layers, channels are created through the three-dimensionally actuated system that dynamically controls phases and amplitudes of the waves moving through them. This may be modelled by essentially taking the combined product of the complex-valued transmission coefficients on each layer.

These layers may be arranged in such a way as to build a digital system with each potentially being a binary "bit", although more states are also possible. On each layer there is an "unconfigured" or "reference" state which is described with unit amplitude and the other state or states are then measured in reference to this "reference" state. For the sake of generality, this is the state with the least transmission loss or most transmission gain. It should be noted that this by no means implies that the transmission through this layer is lossless or that this is a state that does not apply phase change, it simply means that this is the state which is the closest to lossless transmission in this particular design. Thus, the capabilities of the device in terms of dynamic range make the most sense to be described with respect to this, so this state is 'normalized' and assigned a coefficient of unity. By expressing each layer in an 'on' or 'off' manner, bitwise digital control of phase becomes plausible through the stacking of plates that embody phase differences corresponding to complex values that are the different principal roots of unity for the powers of two. This is an exponential of a purely imaginary value, $e^{i\theta}$. A potential desired configuration is shown in FIG. 2. Arbitrarily, many of the more precise layers may be omitted to provide lower complexity at the expense of reduced control.

Figure 3:
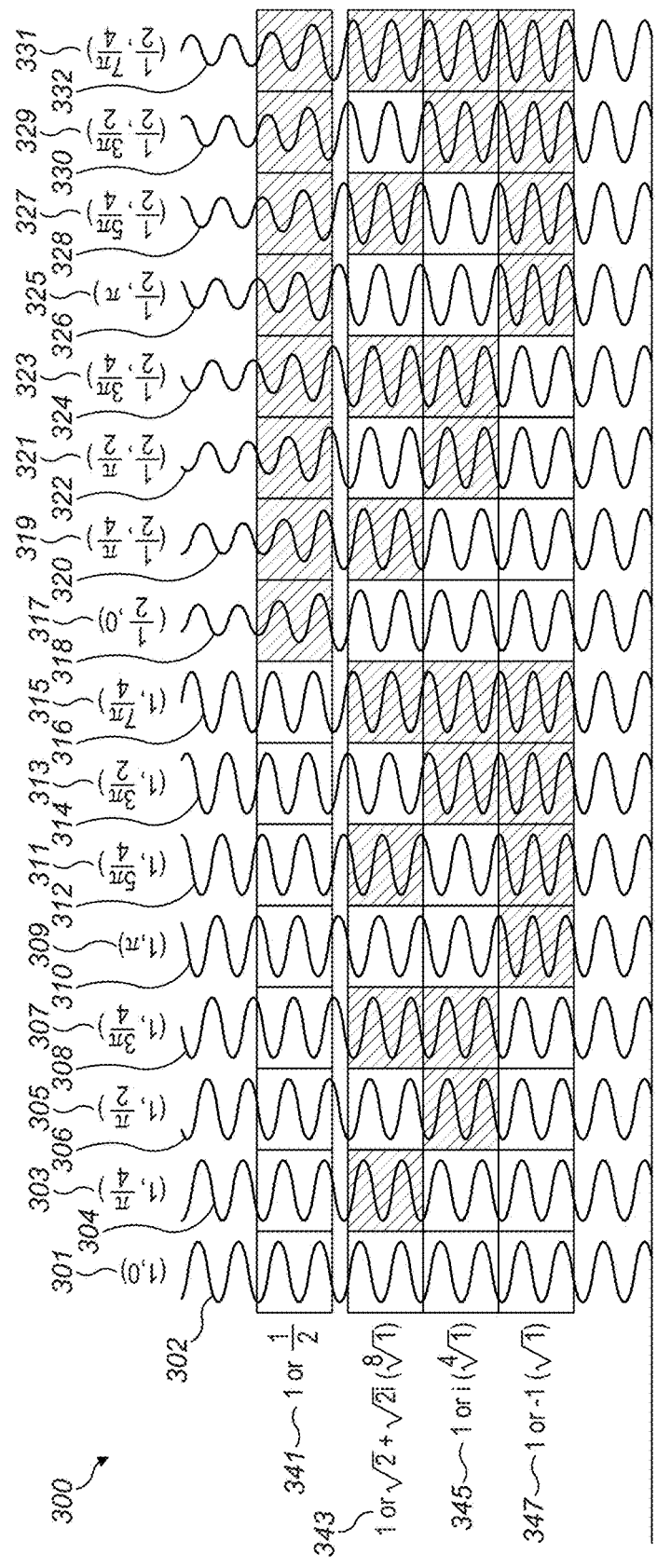
FIG. 3 is a diagram of a stacked meta-material configuration, in accordance with some embodiments.

FIG. 3 shows a diagram 300 of a potential stacked meta-material configuration. Along the top 301, 303, 305, 307, 309, 311, 313, 315, 317, 319, 321, 323, 325, 327, 329, 331 are the possible complex valued transmission coefficients expressed in polar (r, θ) addressable from a single switchable layer of amplitude attenuation, when followed by several layers of phase modification underneath. For each, the r corresponds to the change in amplitude of the exiting wave with respect to the incoming wave, while the θ describes the phase angle offset of the exiting wave with respect to the incoming wave. The layers of phase modification can be expressed as added phase delay or added angle, or alternatively here, values that interact multiplicatively in the domain of complex numbers to give a variety of different resultant signals 302, 304, 306, 308, 310, 312, 314, 316, 318, 320, 322, 324, 326, 328, 330, 332. The numbers at the side 341, 343, 345, 347 give the complex-valued attenuation coefficients of each layer in turn, in both the 'off' and 'on' configurations. In the 'off' configuration, notionally the wave does not experience a change. Nonetheless, although this may be relative as the wave travels through one of these layers, the complex value representing the wave is multiplied by the left value, which is set to unity on all of the layers illustrated. In the 'on' configuration, the complex number representing the wave state is multiplied by the complex number labelling each layer on the right. These modify the relative phase angle or amplitude, modifying the state of the wave as it exits the layer. In this configuration, embodying binary phase control, the phase modification layers may each be expressed as the principal roots of unity of some power of two (although if the metamaterial plate may be switched among more than two states this may extend to the non-principal roots of unity of values beyond two, the roots of those roots of unity and so on). In an actualized design, however, an objectively defined modulus of the complex transmission coefficient may be less than one. This is because in a physical implementation, the absorption and reflection coefficients are likely to be non-zero and so the transmitted wave will have reduced energy and thus root-mean-square pressure with respect to the incoming wave.

These stacks may be specifically tailored to an application such as a focusing system that might only have metamaterial plates that implement phase modification. Or a dynamically focusing parametric speaker may have metamaterial plates that implement both phase and amplitude modification. If this form of acoustic metamaterial actuation is not suitable for changing the amplitude responsively, a hybrid system may be designed wherein elements may be changed in amplitude quickly (such as with the sliding mesh implementation of an acoustic metamaterial plate) and the phase component controlled at a slower rate by the mechanically-actuated tortuous path acoustic metamaterial. This would be advantageous in the case of haptic effects, in which moving the focus (which requires phase change and does not require high speed may be implemented) in a device which switches or updates slowly, while amplitude change (which requires high speed oscillation to generate low frequencies in the vibrotactile range) must be actuated at high speed.

G. Digital Amplitude Control

Amplitudes may also be dynamically controlled through the stacking of layers with discrete states, but the approach to find the optimal stacking arrangement has added complexity. This is because with each new amplitude attenuation layer, the transmitted amplitude is multiplied. (This differs from the phase angle where due to the complex multiplication the angles can be summed, and is thus simple to compute.)

Nonetheless, this multiplication can be viewed as a linear combination in a logarithmic space. A summation in logarithmic space for a unit complex value or exponential of a purely imaginary is the same as a linear summation of phase angles, as can be seen from Euler's formula, $e^{i\theta}=\cos\theta+i\sin\theta$. Considering the case of a n-layered real-valued only metamaterial, each layer of which expresses one binary digit of amplitude control, there is an optimal set of transmission values that will produce the largest range of amplitudes. This optimal solution for layer $m=0, \ldots, n-1$ of n layers with binary states can be described by a real-valued exponential $e^{-(2^n-1)x}=1-e^{-x}$ where x can be found by solving $e^{-(2^n-1)x}=1-e^{-x}$, for the real solution. This determines the x value for which the bit string that describes the layer configuration that represents only the least significant reduction in amplitude with respect to the reference state; (00 . . . 01) is the same distance from unity as the layer configuration that represents the most significant reduction in amplitude (11 . . . 11) is from zero. These bit strings then correspond to the 'off' or 'on' configuration state of the metamaterial layers or plates described previously. By turning each to either the 'off' or 'on' state in the prescribed manner, the amplitude level can be tuned to be as expressive as possible given the number of layers available. This expressiveness results from the set of x values, found from the above equation, which are designed into the metamaterial plates for an optimum distribution of metamaterial controllable amplitude. An equivalent equation can be created for any combination of layers with any number of states. This gives the set of layer coefficients that for a given n best cover the unit interval. For example, when n=4 each filter would express a real-valued transmission coefficient corresponding to $e^{-x}$, $e^{-2x}$, $e^{-4x}$ and $e^{-8x}$ where the value of x can be found by solving $e^{-(2^4-1)x}=1-e^{-x}$. This gives the optimal four acoustic metamaterials with real transmission coefficients values of 0.8720, 0.7603, 0.5781 and 0.3341 respectively. The solution to this equation for x ensures that the range of amplitudes producible by the system is configured to be the optimal possible spread between 0 and 1, in this case with a maximum gap of 0.1280 between 1 and the largest value and between 0 and the smallest value. This yields the most expressive possible stacked metamaterial system for a given design complexity.

Figure 4:
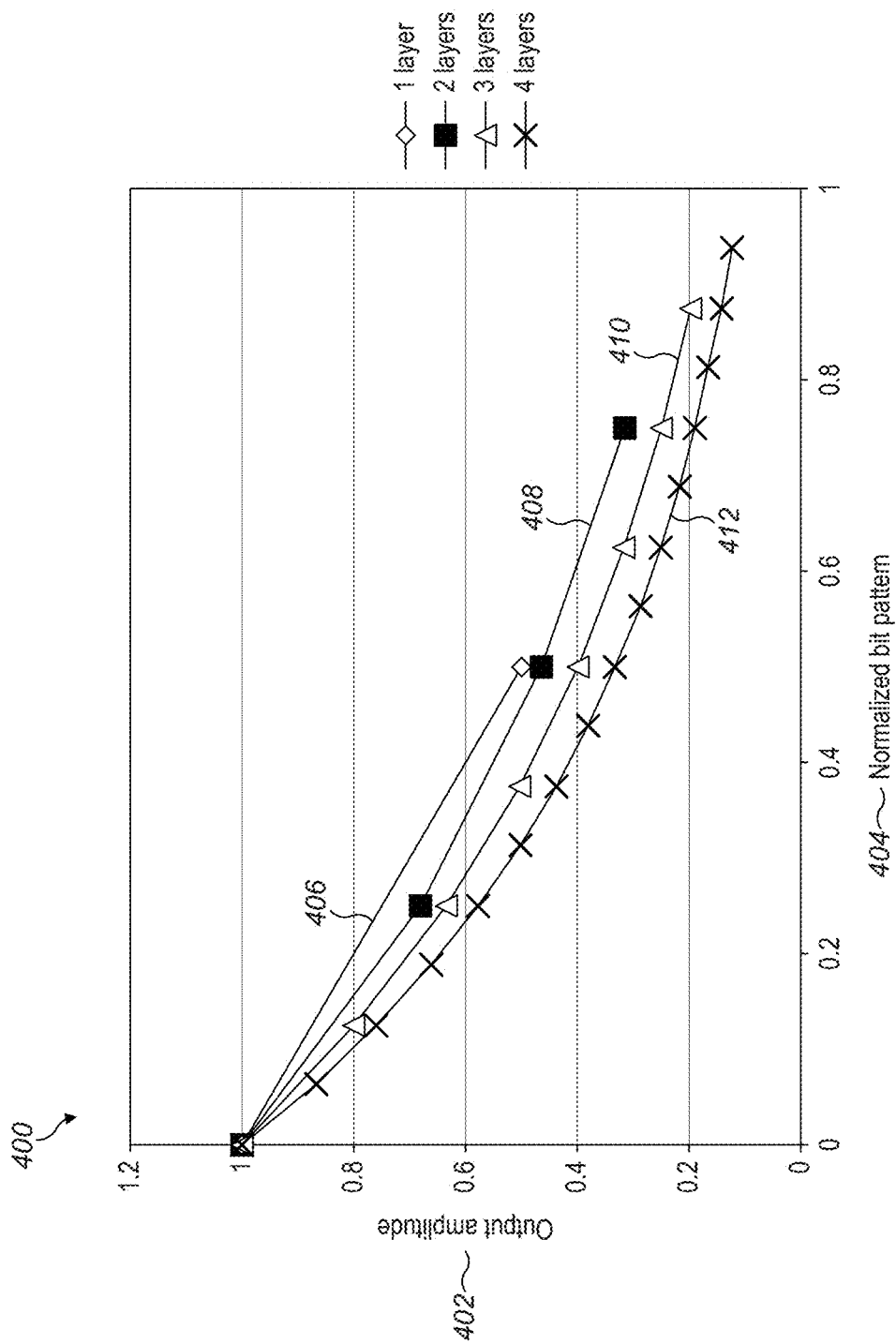
FIG. 4 is a graph of 4 layers showing a differing non-linear discretization for the amplitude of a signal, in accordance with some embodiments.

Turning to FIG. 4, shown is a graph 400 of how different numbers of layers (n=1, 2, 3 and 4) each give a differing non-linear discretization for the amplitude. The x-axis 404 is the normalized bit pattern value, whose individual bits represent the 'on' or 'off' switching state of each of the metamaterial layers. It is also a non-linear distribution of amplitude values; "non-linear" due to the multiplication of the attenuation coefficients on each layer. The y-axis 402 is the output amplitude. This is correlated to the input bit pattern to the layer state, which may also be interpreted as the inversion of an input intensity value that would then map onto output amplitudes in a non-linear way. The coefficient of these layers of amplitude attenuation have in each case been chosen by evaluating the above equation for 1, 2, 3 and 4 layer(s). The curves in the figure show the inversely correlated relationship between the input bit pattern interpreted as a number, and the resulting possible levels of output amplitude, for one layer 406, two layers 408, three layers 410 and finally four layers 412 of actuated amplitude attenuation metamaterials.

H. Digital Complex Control

The complex transmission coefficients generated in the actuated and un-actuated positions of the acoustic metamaterial do not have to be purely real or purely imaginary. They may very likely be a combination of real and imaginary parts due to material limitations, acoustic impedance and physical effects that cannot be completely eliminated. In this case, an acoustic metamaterial can be designed to have a fully complex transmission coefficient with respect to the reference state. To achieve this, the approach to generate the real exponential can be merged with the approach to generate the imaginary exponential. For any real k, after having solved for the real part as before, for each layer m a complex coefficient of $$e^{-2^m\left(x+\frac{2\pi ki}{2^n}\right)}$$

can be found. These fully complex exponential solutions correspond to values that can be substituted in exactly the same way as before to create a n-ary hierarchy of complex exponentials which can be used to produce a spiral of sample points across the complex plane, sampling uniformly both amplitude and phase in combination. Alternatively, the phase can be sampled using an irrational step by using a coefficient like $e^{-2^m(x+(3-\sqrt{5})\pi i)}$, in which each step is separated by the golden angle.

Figure 5:
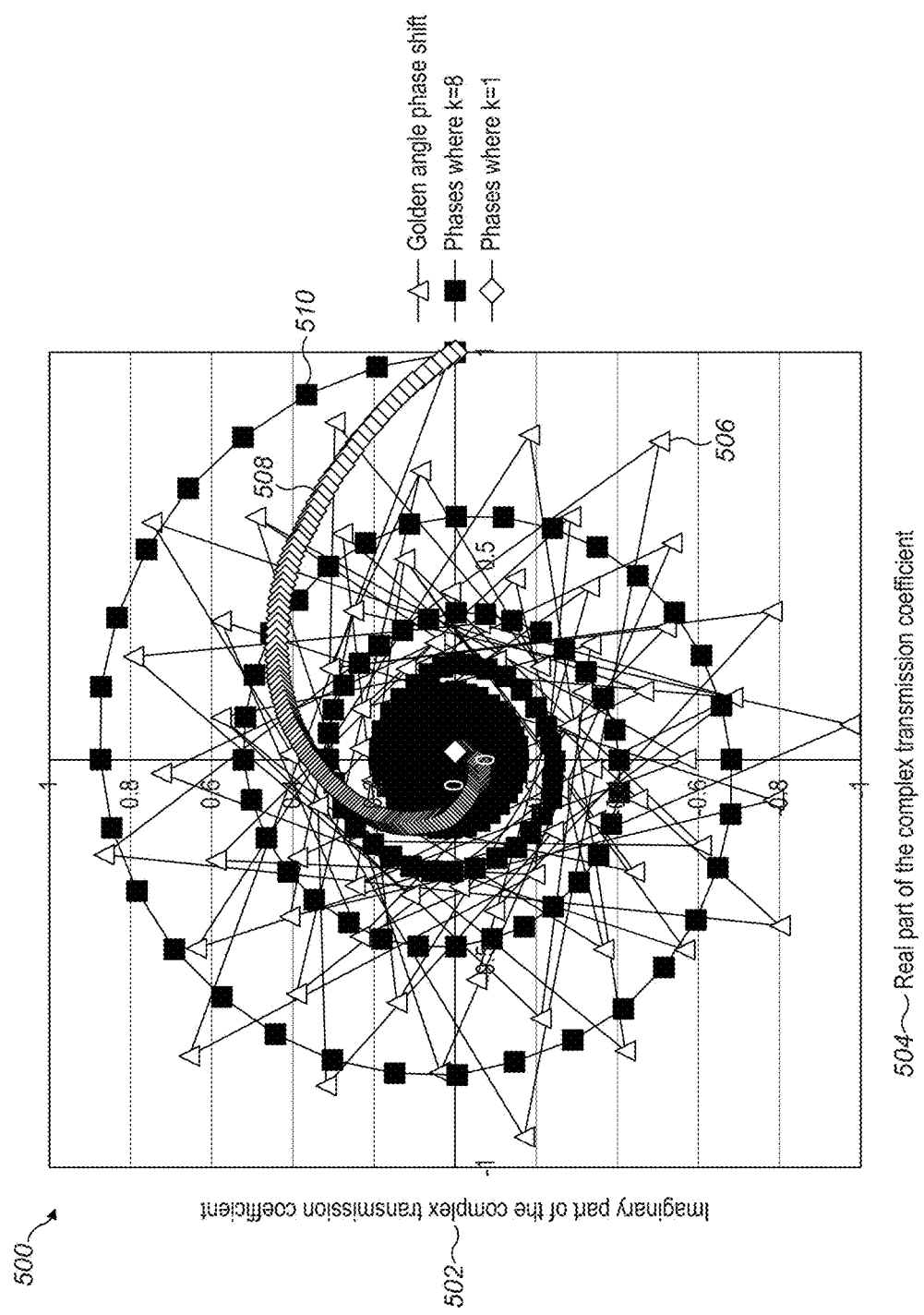
FIG. 5 is a graph, showing the results of sampling the complex plane of possible wave states with 8 layers of metamaterial, in accordance with some embodiments.

Turning to FIG. 5, this less structured approach to sampling are compared with the uniform sampling for n=8. Shown is a graph 500 with the x-axis 504 is the real part of the complex transmission coefficient and the y-axis 502 is the imaginary part of the complex transmission coefficient. Shown on this graph are the results of sampling the complex plane of possible wave states with 8 layers of metamaterial. The input bit interpretation is not shown, but is implied by the positions of the points, as the reference point where all are zero or in the 'off' state always has a product which produces a complex coefficient of 1. Two uniform samplings of the phase and amplitude space are shown, one in which the system traverses the polar $2\pi$ radians in angle once 508 and the other involves traversing the polar $2\pi$ radians eight times ($16\pi$) 510. The last traversal involves jumping in phase by an irrational angular value 506 in order to better sample the area of the complex plane. This results in increased sampling efficiency of the space of possible exit waves at the expense of a complicated lookup table or function. Such a result occurs when implementing the complex value to bit string conversion to actuate the device into the state required to produce a wave with a given complex coefficient.

By creating a set of layers using one of these complex solutions for x, non-unity transmission and other losses in efficiency can be factored into the acoustic metamaterials. This occurs while continuing to result in an efficient sampling of the complex wavefunction space by the digitally actuated materials.

I. Specific applications for metamaterials in haptic systems

Thus, actuated stacked metamaterial layers may accomplish one or more of the following:

1) Mechanically actuated teeth in tortuous path designs to turn on/off phase shifts;

2) Mechanically actuated meshes which enable the control of effect open area leading to amplitude control; and 3) Mechanically opening of holes to control a Helmholtz resonator in a layer.

These layers do not have to encode a phase shift or an amplitude change—they may encode both in a complex phasor.

Alternatively, the layers may be arranged such that they sample a particular line or curve in the complex plane—this can include both purely phase and purely amplitude curves.

Alternatively, the layers may be arranged such that that they sample the complex plane of potential phasors efficiently using a logarithmic spiral of coefficients reachable through digital control.

Alternatively, a system may conduct a sampling of the complex plane through an irrational step such as the golden angle in order to find the most efficient packing of coefficients in the complex plane.

Alternatively, the system disclosed above may be used to create a haptic effect and/or parametric audio.

Alternatively, the system disclosed above may be used for single or multiple control points using an acoustic lens for creating haptic effects and/or for creating parametric audio and/or for causing objects to levitate.

Alternatively, the system disclosed above may be used for non axis-symmetric focusing or manipulations with acoustic lenses.

Alternatively, the system disclosed above may be used for the design of impedance-matched metamaterial to maximize transmitted energy using tortuous paths and labyrinthine structures Alternatively, the system disclosed above may use an array underneath to provide input to metamaterial structure. The metamaterial structure provides acoustic "lenses" and "mirrors" in space that can be structurally separate to the reconfigurable acoustic source of a transducer array. Both "lenses" and "mirrors" can be reconfigurable through phase and amplitude changes.

Alternatively, the system disclosed above may use metamaterials that are stacked. These metamaterials do not have to be physically touching for their properties to be concatenated. The layers in such stackings may have or be configured to have, distinct properties, such as: imparting angular momentum through phase manipulation; focusing; and gripping through phase singularity.

II. Acoustic Wide-Angle Lenses And Tunable Resonators In Haptic Systems

To create haptic feedback, an array of transducers is actuated to produce an ultrasonic acoustic field that then induces a haptic effect. It has been discovered through theory, simulations and testing that the transducers must be positioned in non-uniform or irregular patterns for best effect. While this can be to some extent achieved for positioning during PCB assembly, arbitrary positioning raises the cost of the assembly process and reduces the transducer density possible. If there is a method to achieve this positioning of acoustic sources without resorting to complex and costly assembly processes, then there is a commercial advantage in such a method.

The angles and directions of the acoustic transducers also play a large part in determining the haptic interaction space, which is a function of the carrier frequency and the field of view of the transducer elements. During PCB assembly, precision angling is unrealistic, constraining a straightforward design to have only a limited interaction space that will become smaller as the ultrasonic carrier frequency increases. An approach to enable this to happen at low cost would be advantageous.

Further simulations have shown that Helmholtz resonators placed over the transducers can increase the output amplitude or efficiency, but only for a fixed frequency dependent on the size and shape of the resonating chamber. Since during the normal creation of haptic effects this frequency can vary in some band around the ultrasonic carrier, it could be advantageous to be able to modify dynamically the resonant chamber to effect substantial power savings.

A. Array Coverings

To modify the configuration of a transducer array which has been cost-effectively fabricated in a uniform, potentially rectilinear grid or other repeating pattern on a PCB, a structure may be overlaid that has been built that specifically reconfigures the transducer array into a new configuration that is not constrained by the PCB layout. This structure consists of a series of pipes which can redirect the acoustic waves to be emitted from a new given position and in a new given direction. Each pipe must be a close to straight as possible and, in the cases where it is not straight, must be smoothly curved. It must also have prescribed entry and exit points, as well as entry and exit tangents appropriately normal to the wavefront normal direction of the entering and exiting sound waves.

In order to accomplish this, the footprint of the rectilinear grid of transducers on the PCB to modify must first be decided or found. This necessarily informs the number and distribution of desired acoustic output points and directions that it is possible to create. This is then synthesized with the intention of reconfiguring the array from a rectilinear grid on the PCB (for example) into a different configuration with more desirable properties, such as increased field of view, reduced extra maxima or both. Also, it may be costly, difficult or impossible to produce this in a PCB design. Next, the center point of each physical transducer element with a emission direction is determined, which is then paired with a corresponding output element location in the structure. Next, a squared minimum distance criterion is used to evaluate the fitness of transducer-output pairs, swapping the outputs if this is found to increase fitness (decrease the summed squared minimum distances between the physical transducer input and output). Then a curvature-minimizing spline or other curvature-minimizing curve is solved for and is drawn between the transducer center point and the output point, wherein the endpoints are constrained by the tangent vectors of the transducer emission direction and acoustic output direction respectively. As the pipes are required to be a certain diameter, this is expressed as a minimum distance constraint among the set of created curves and a further step may try to enforce a minimum distance if possible. Finally, the curves and their pipe diameters are carved geometrically from a solid shape appropriate to the exit position and directions given to produce a design for fabrication.

Figure 6:
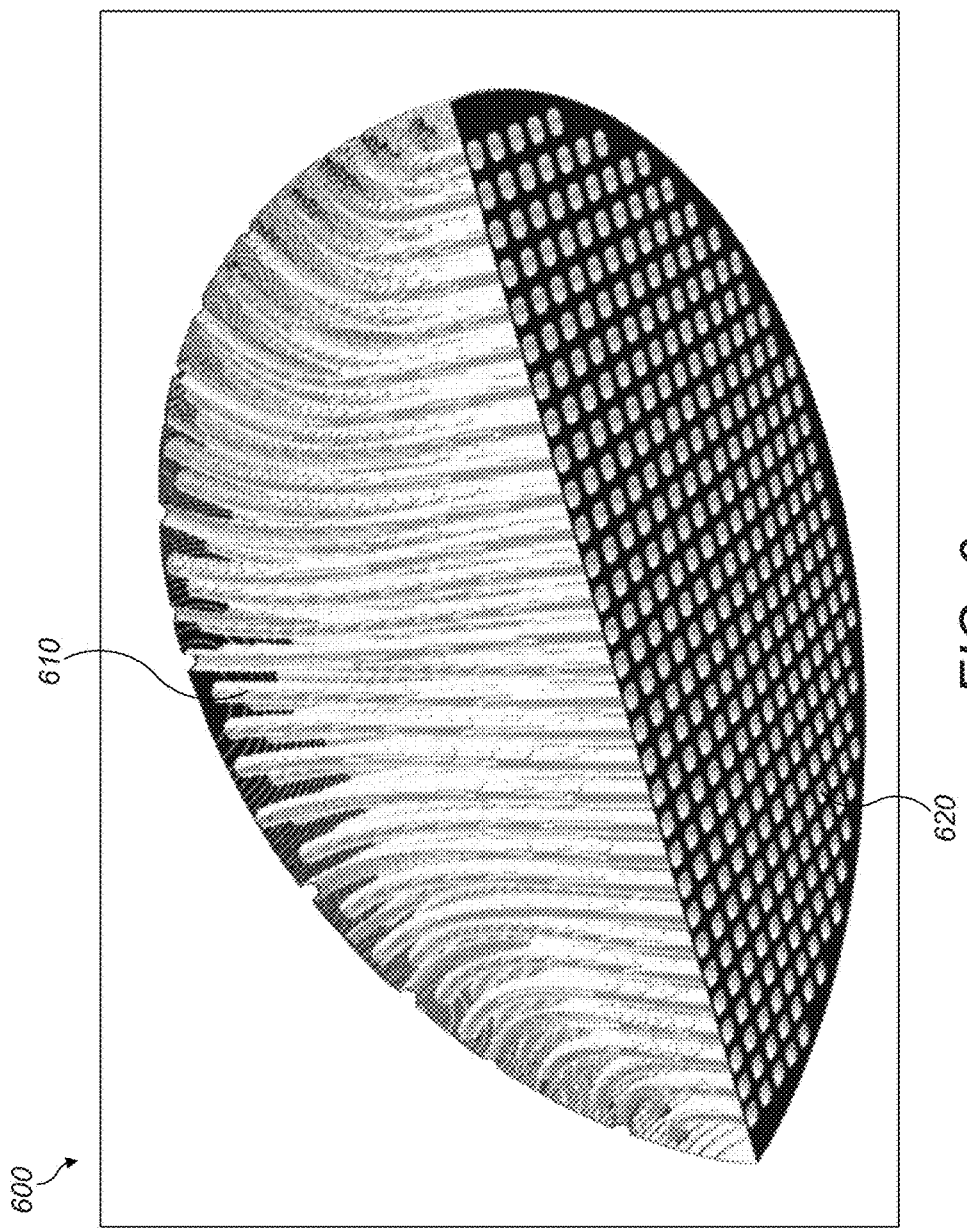
FIG. 6 is a cut-away view of a completed model of a structure that addresses the issues of field of view and the removal or reduction of extra unwanted maxima or spurious images, in accordance with some embodiments.

Turning to FIG. 6, shown is a cut-away view of a completed model of a structure 600 that addresses the issues of field of view and the removal or reduction of extra unwanted maxima or spurious images. Inside the 3D model of the structure the pipes 610 that serve to direct the acoustic output are visible. In the lower part of the image the entrance holes to the pipes are visible, taking output from a grid of transducers which have been arranged or fabricated rectilinearly 620.

Figure 7:
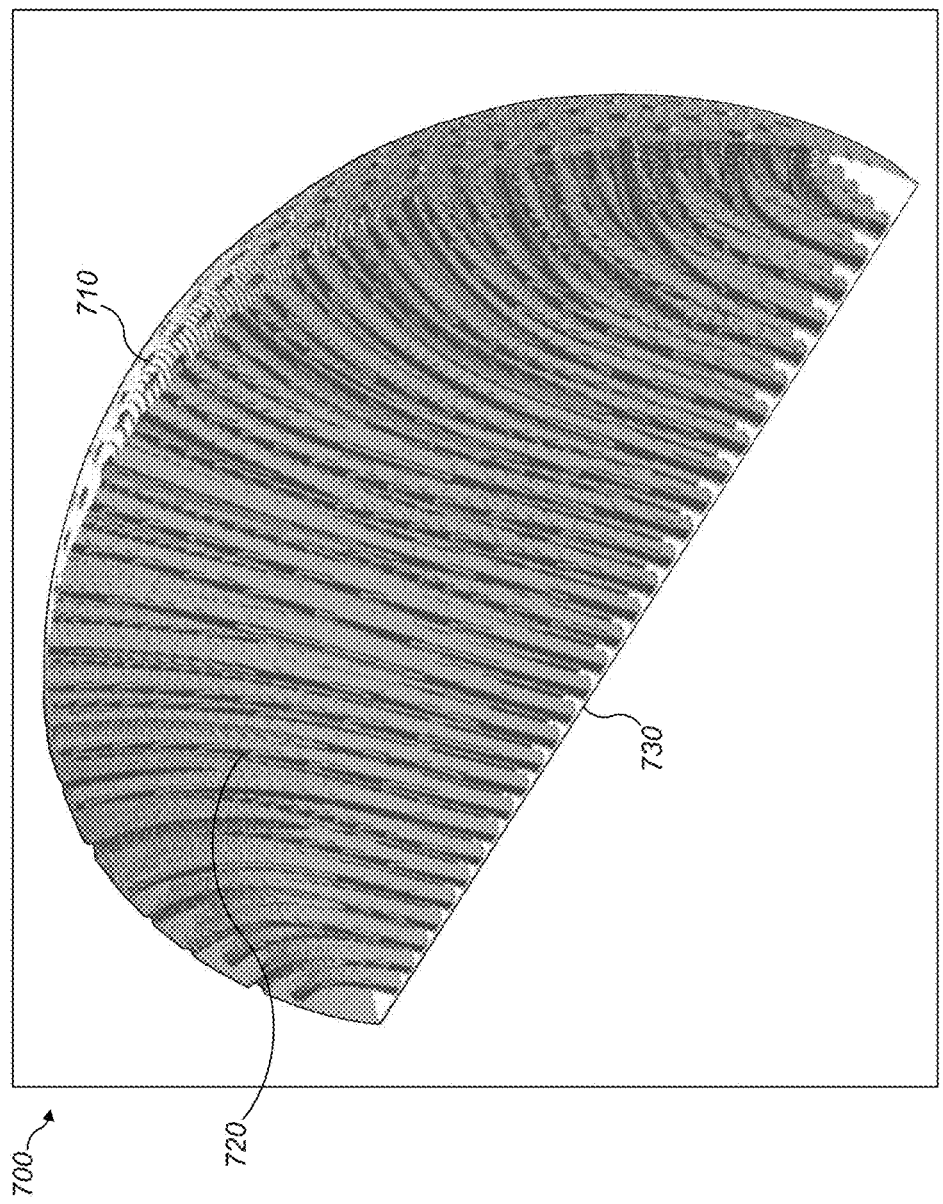
FIG. 7 is a further cut-away view of a completed model of a structure that addresses the issues of field of view and the removal of spurious images, in accordance with some embodiments.

Turning to FIG. 7, shown is a further cut-away view of a completed model of a structure 700 that addresses the issues of field of view and the removal of spurious images. Now visible are the exit holes from the pipes 710. These are arranged such that their non-regular arrangement generated by irrational arithmetic serves to scatter energy away from any particular location by replacing co-linear arrangements of acoustic output locations. The pipes in the cut-away remain visible 720 and the line of entry points into the structure are also visible in the lower part of the image 730.

Thus, FIG. 7 shows the use of non-uniform output location arrangements; FIGS. 6 and 7 show the tangents on the curvature minimizing pipes; and FIG. 6 shows the rectilinear uniform arrangement of the pipe inputs.

Figure 8:
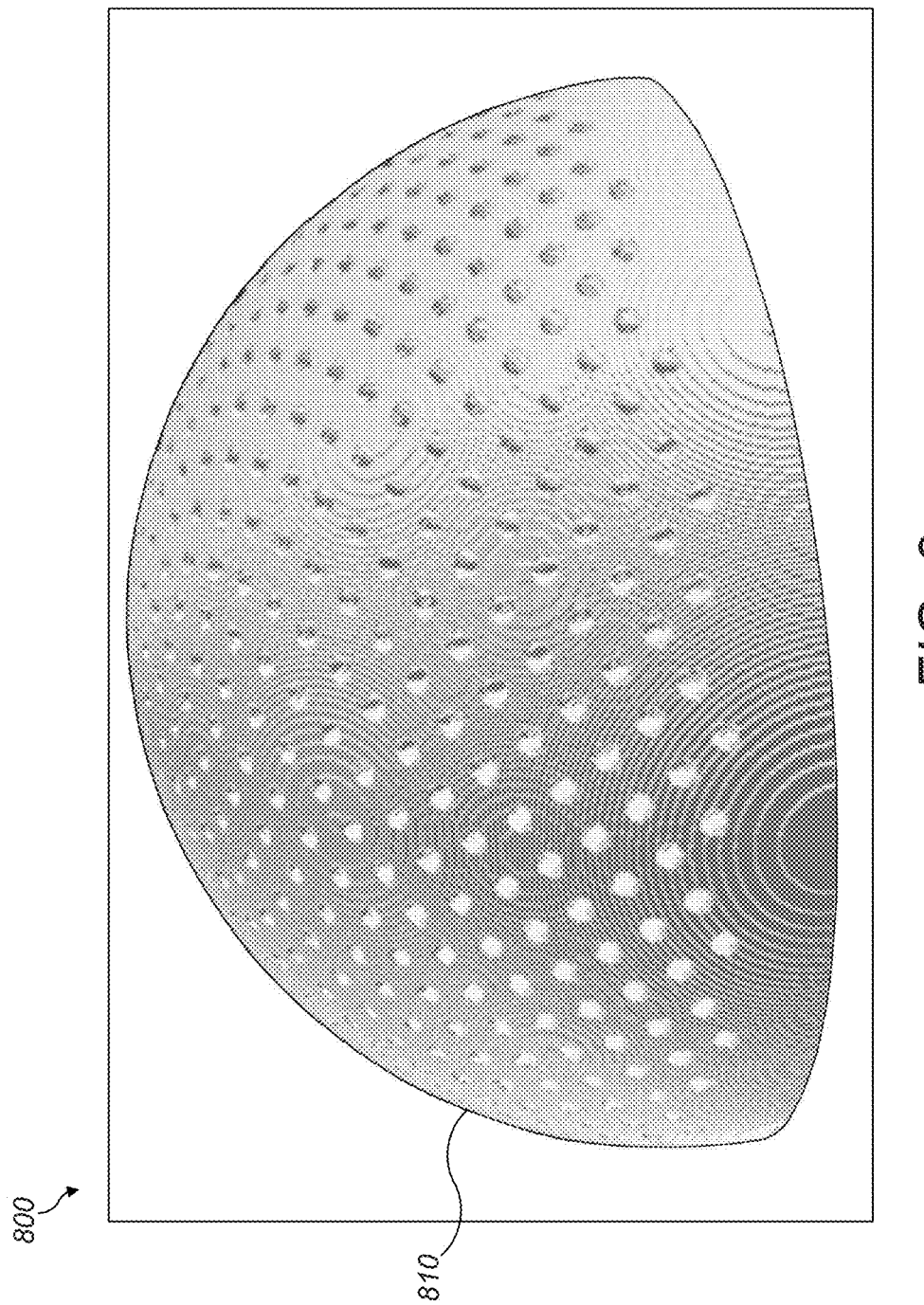
FIG. 8 is a view of a completed model of a structure that addresses the issues of field of view and the removal of spurious images, in accordance with some embodiments.

Turning to FIG. 8, shown is shown is a view of a completed model of a structure 800 that addresses the issues of field of view and the removal of spurious images. The completed irregular structure of outlet holes is shown 810 following the surface of a hemisphere, although this should not preclude a less extreme example of a smaller adjustment to the addressable field of view (in the form of an array covering of this kind with reduced pipe length, thickness and curvature) from the transducers in which control point can be generated.

B. Tunable Helmholtz Resonators

As can be seen from FIG. 6, there is a portion of the tube 610 that moves immediately away from the PCB. This can be readily converted into a Helmholtz resonator with a little extra material. The frequency that a Helmholtz resonator amplifies is tied closely to its volume and the size of the open holes in its surface. By increasing or decreasing the area of the open holes, the frequency that the resonance amplifies is changed to be higher or lower respectively. The same effect can also be applied to the volume contained in the Helmholtz resonator, by changing the volume the resonance can be changed. One way to achieve this is to add an extra piece of moving structure to mechanically open and close the holes. To keep the system cost-effective however, the volume of the chamber can instead be modified by actuating further membranes bounding the resonator separately to the ultrasonic transducer. As the frequency shift required for considerable efficiency savings when creating a haptic effect is of the order of a few percent in either higher or lower frequency, this generates a much lower power design since the amount of energy required by the extra transducer is much smaller.

III. Acoustic Radiation Force For Optical Modulation Through Phased Arrays

In an acoustic field, control points may be defined in the field that lead to the creation of tightly controlled pressure at these locations.

These effects are mediated through the creation of small acoustic radiation forces, which is a non-linear effect generated by acoustic waves. For example, lenses and mirrors may be made of a variety of different materials. Each of these has mechanical properties that governs its response to incident forces. Due to ease of shaping, lenses and mirrors may be made of liquids and gels on top of more traditional materials. Creating a non-contact acoustic radiation force provides such a small incident force that it can be used for the purposes of adaptive optics. Modifying the force over time may allow lenses or mirrors to change over time, allowing optics to be synchronized to a clock or in a way that captures more data about the scene of interest.

For example, light field cameras can use an array of small lenses configured differently to obtain information about the directions of incoming light. Using an acoustic radiation force to quickly modify the lens in a camera in an undulating pattern would enable light directions to be extracted as the sum of component light pixels recorded from predictable positions and directions. Computational photography techniques may then be used to extract the resulting data.

Using acoustic radiation force in this way allows gel and liquid lenses to be reshaped in situ into a variety of different forms suitable for a range of different tasks. They can be made convex or concave depending on the distribution of control points and places where the pressure (and thus the acoustic radiation force) is controlled in the field. By placing these into a distribution, the lens surface may be totally reshaped in a way that enables complete control over the surface geometry. In gels or liquid lenses dominated by surface tension, this would enable further freedom over existing techniques for adjusting lens geometries. Further, given that the acoustic phased array is a separate and completely contactless device, it simplifies the design and manufacture of the lenses or mirrors in question. This enables the phased array to be serviced or replaced separately to the optical elements, especially as technological progress may render obsolete either component over time.

Figure 9A:
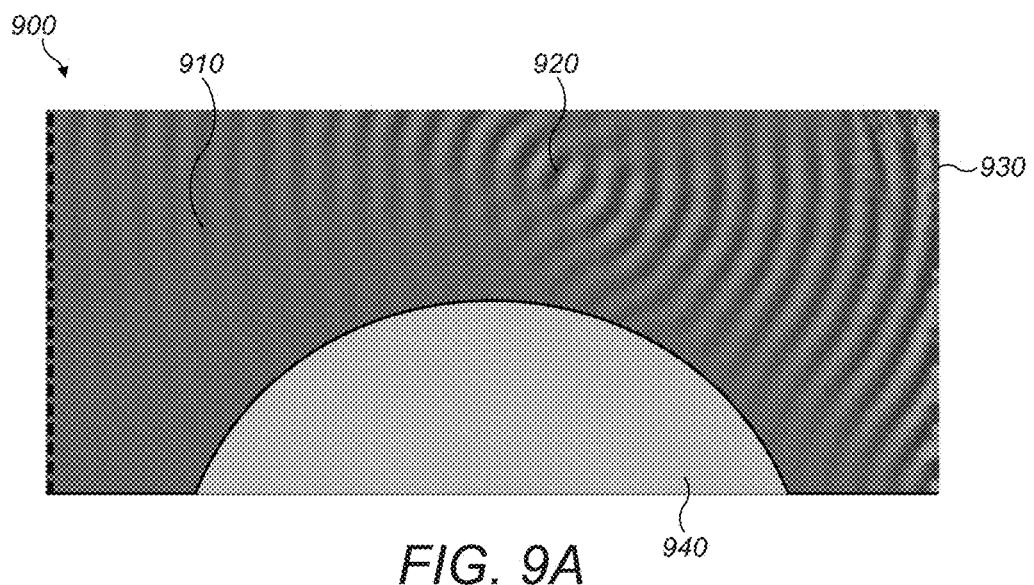
FIGS. 9A and 9B are two-dimensional mock-ups of a section of an acousto-optical system, in accordance with some embodiments.
Figure 9B:
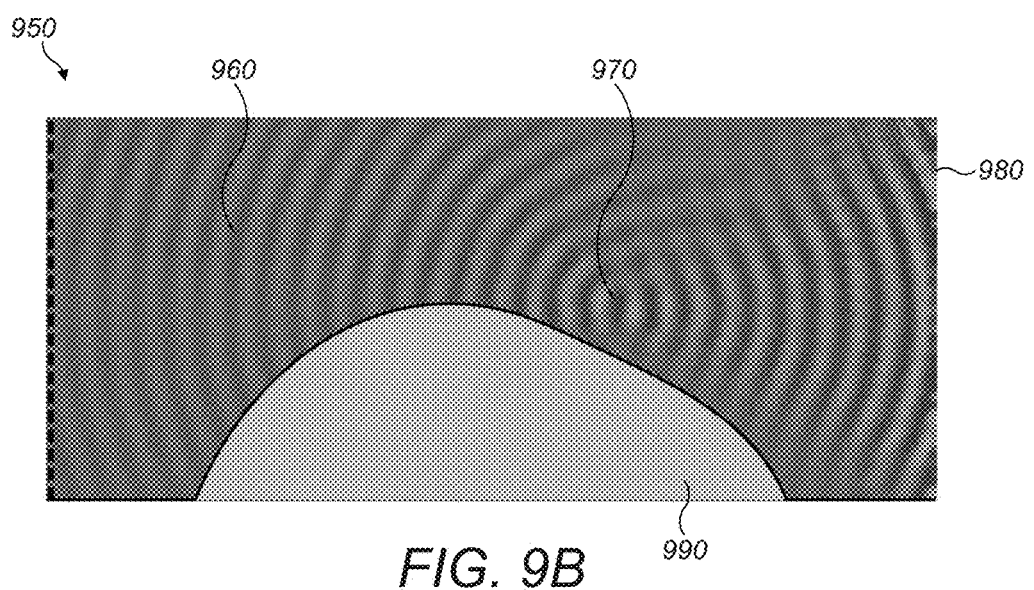

One such design of a system may place the lens in the center of an annular array or, alternatively, inside a tube of transducers. Shown in FIG. 9A is a two-dimensional mock-up of a section of the acousto-optical system 900. Shown is acoustic field 910, actuated transducers 930 a lens 940 and a single control point 920. The single control point 920 does not interact with the lens 940. Shown in FIG. 9B is a two-dimensional mock-up of a section of the acousto-optical system 950. Shown is acoustic field 960, actuated transducers 980 a lens 990 and a single control point 970. Here the single control point 920 containing high pressure is lowered towards the lens 990. As a result the lens 990 deforms slightly (effect greatly exaggerated). This can be used to modify the curvature of a lens or mirror surface without touching them allowing for precise non-contact geometry control in complex systems in which more traditional approaches would involve localized electronics, adding unwanted complexity to existing assemblies of optical elements.

Further, existing designs of lens systems could recess acoustic elements that can work together in a similar configuration in any system of lenses, such as telescopes, microscopes and other optical systems to provide further non-contact calibration.

IV Time-Harmonics Metamaterials

A. Introduction

The optimal conditions for producing an acoustic field of a single frequency can be realized by assigning activation coefficients to represent the initial state of each transducer. But to create haptic feedback, the field can be modulated with a signal of a potentially lower frequency. For example, an acoustic field of 40 kHz may be modulated with a 200 Hz frequency to achieve a 200 Hz vibrotactile effect.

Meta-materials are materials that have artificially designed structural properties that change their physical behavior in ways that may be generally unavailable in existing materials. They can be artificially structured to control and manipulate light, sound and many other physical phenomena. Specifically, meta-materials of interest here are those pertaining to the manipulation of acoustic waves. They may be engineered to take a monochromatic acoustic wave and apply phase shifts or delays through modification to the internal structure, enabling such a material to generate a pre-defined focus or other modification to the resulting acoustic field.

Modifications to meta-materials may be actuated electronically to provide full re-configurability. This enables the device to be further organized by splitting the production of the field into separated generation and control components, potentially yielding benefits in efficiency. But even this requires a per-channel actuation or more, necessitating an extensive and thus expensive array of electronics and components.

As the haptic effects that are to be reproduced in mid-air consist primarily of synchronized repeating structures of phase and amplitude through time, this suggests that a meta-material may be designed to fall in between a static meta-material and a fully actuated and re-configurable meta-material. In other words, this is a material that implements phase and amplitude change through purely mechanical means. This would be beneficial because it could embody cyclical haptic effects without requiring complex and potentially expensive electronics.

B. Design

A time harmonic meta-material is repeated cyclically in the same manner while changing the acoustic field state continuously. Since time harmonic systems can be parameterized in angle, it is therefore reasonable that this achieved by rotation. Since this must also be synchronized, the angular position of the elements with respect to each other must be actuated only in lockstep, potentially with a fiducial to show the zero angle location in the meta-material to aid assembly. This leads to the consideration of a design involving a plethora of interlocking and rotating structures.

In some instances, such as in intentionally non-uniform configurations of acoustic elements designed for the reduction of unwanted geometrical artifacts, it is preferable not to pack the structures too tightly. But since the elements must touch and thus cannot be too sparse, this results in a roughly dendritic structure in order to propagate the mechanical motion. To build an efficient metamaterial, similarly to the electronically driven transducers needed to build a traditional array, these rotating structures must ideally be packed as closely together as possible. When close packing of rotating mechanical elements is required, it is reasonable to consider designing them as interlocking geared structures. As these geared structures must interlock, it is prudent to consider alternating clockwise and anti-clockwise rotating structures necessary to tessellate a two-dimensional space without generating a jammed structure that cannot rotate freely. This structure may also instead tessellate space while being non-uniform, through the utilization of a quasi-crystal structure. Each of these structures must have the phases and amplitudes that are to be produced encoded into the structure such that it is expressed as the structure rotates. This suggests that multiple copies of the phase and amplitude behavior may be encoded in the $2\pi$ angle rotation around the individual meta-material element.

A further restriction on the interlocking elements is therefore that the rotation of these elements must parameterize time using an angle. This way, the speed of angular rotations must—in addition to the requirement of unjammed interlocking gear elements—also have an integer ratio to the periodic acoustic pattern. This implies that in the case of only one copy of the periodic field behavior being encoded into the structure, only one angular speed and thus circumference is permissible in order that the structures stay synchronized in their time harmonic behavior.

But if the behavior of the acoustic field is encoded multiple times around the edge of such an element, this unlocks the possibility of having different circumferences. This works if the ratios of the circumference is matched by the number of times that the periodic behavior is encoded in the $2\pi$ angle rotation of any individual meta-material element. This implies that the diameter of the interlocking circular or in three dimensions cylindrical elements must be either the same circumference or have circumferences that are integer ratios.

Figure 10A:
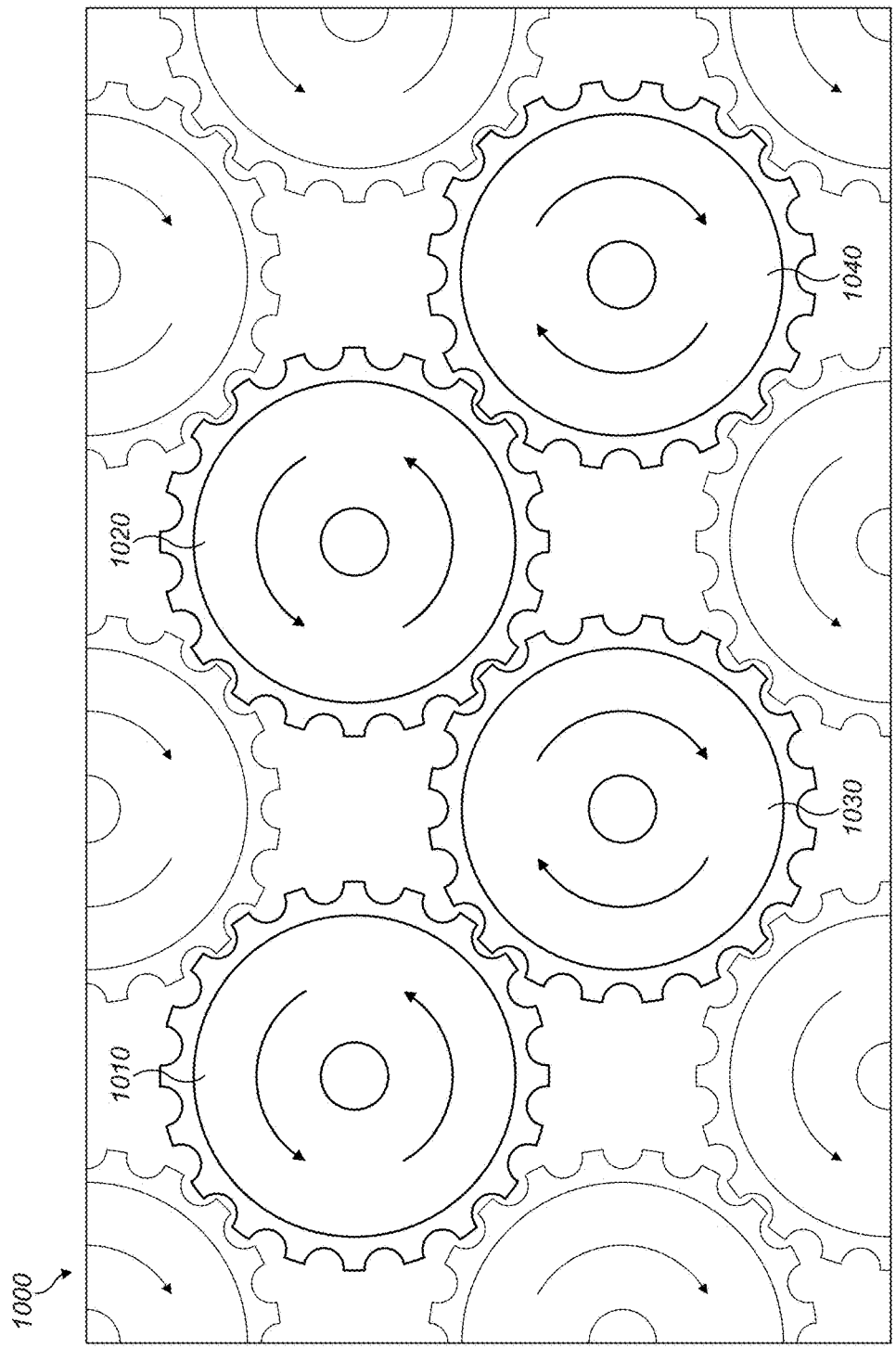
FIGS. 10A, 10B and 10C are series of interlocking geared elements designed to tessellate space, in accordance with some embodiments.

Shown in FIG. 10A is a series 1000 of interlocking geared elements 1010, 1020, 1030, 1040 so designed as to tessellate space. These gears must travel in opposite directions (compare 1010 and 1020 with 1030 and 1040). This is the simplest design but it causes a large percentage of open area.

Figure 10B:
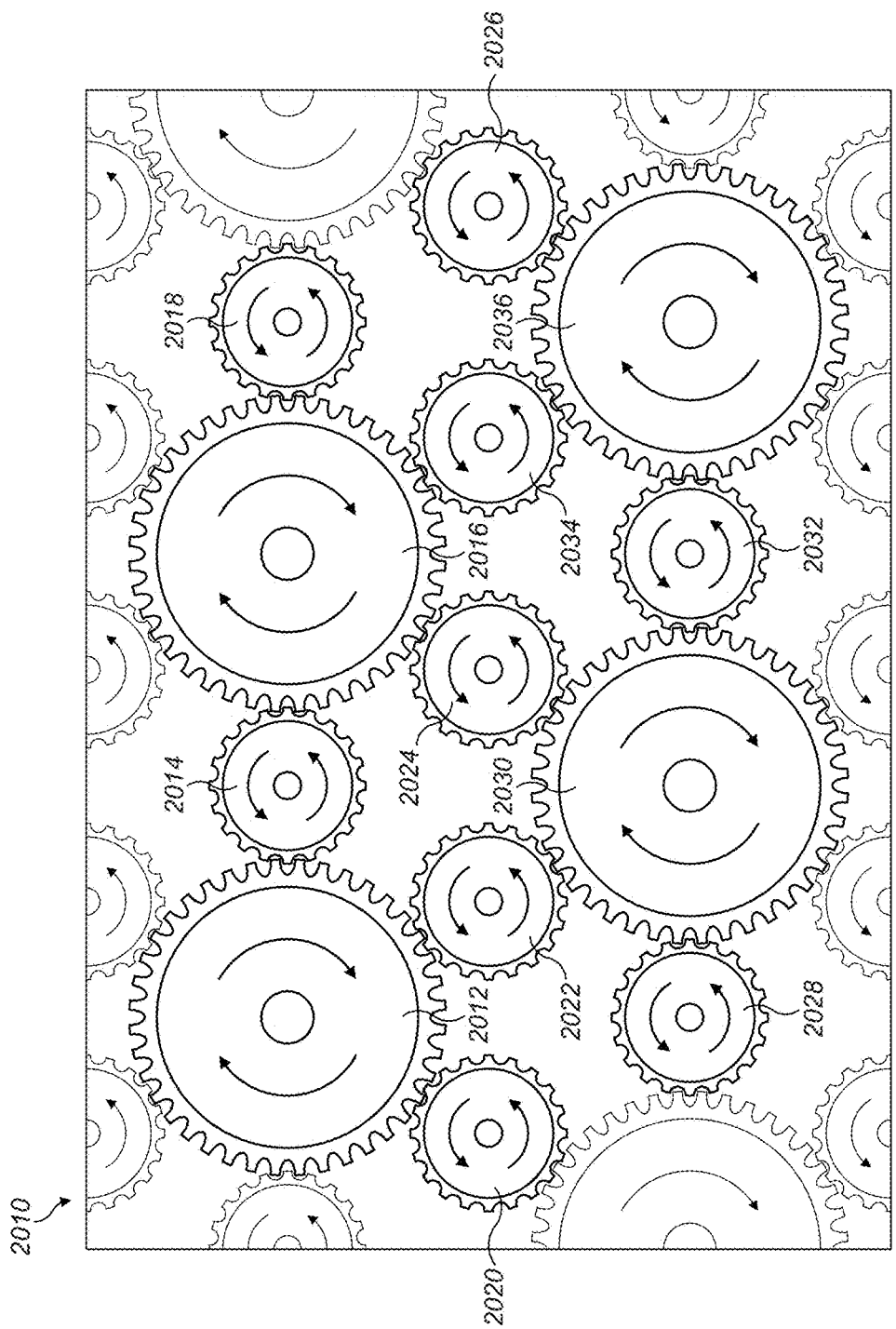

FIG. 10B shows a further configurations 2010 that tessellate two-dimensional space using larger interlocking gears 2012, 2016, 2030, 2036 and smaller interlocking gears 2014, 2018, 2020, 2022, 2024, 2026, 2028, 2032, 2034. This arrangement will operate properly if the circumferences of the larger interlocking gears 2012, 2016, 2030, 2036 and smaller interlocking gears 2014, 2018, 2020, 2022, 2024, 2026, 2028, 2032, 2034 have integer ratios. Further, the larger interlocking gears 2012, 2016, 2030, 2036 travel in opposite directions from smaller interlocking gears 2014, 2018, 2020, 2022, 2024, 2026, 2028, 2032, 2034.

Figure 10C:
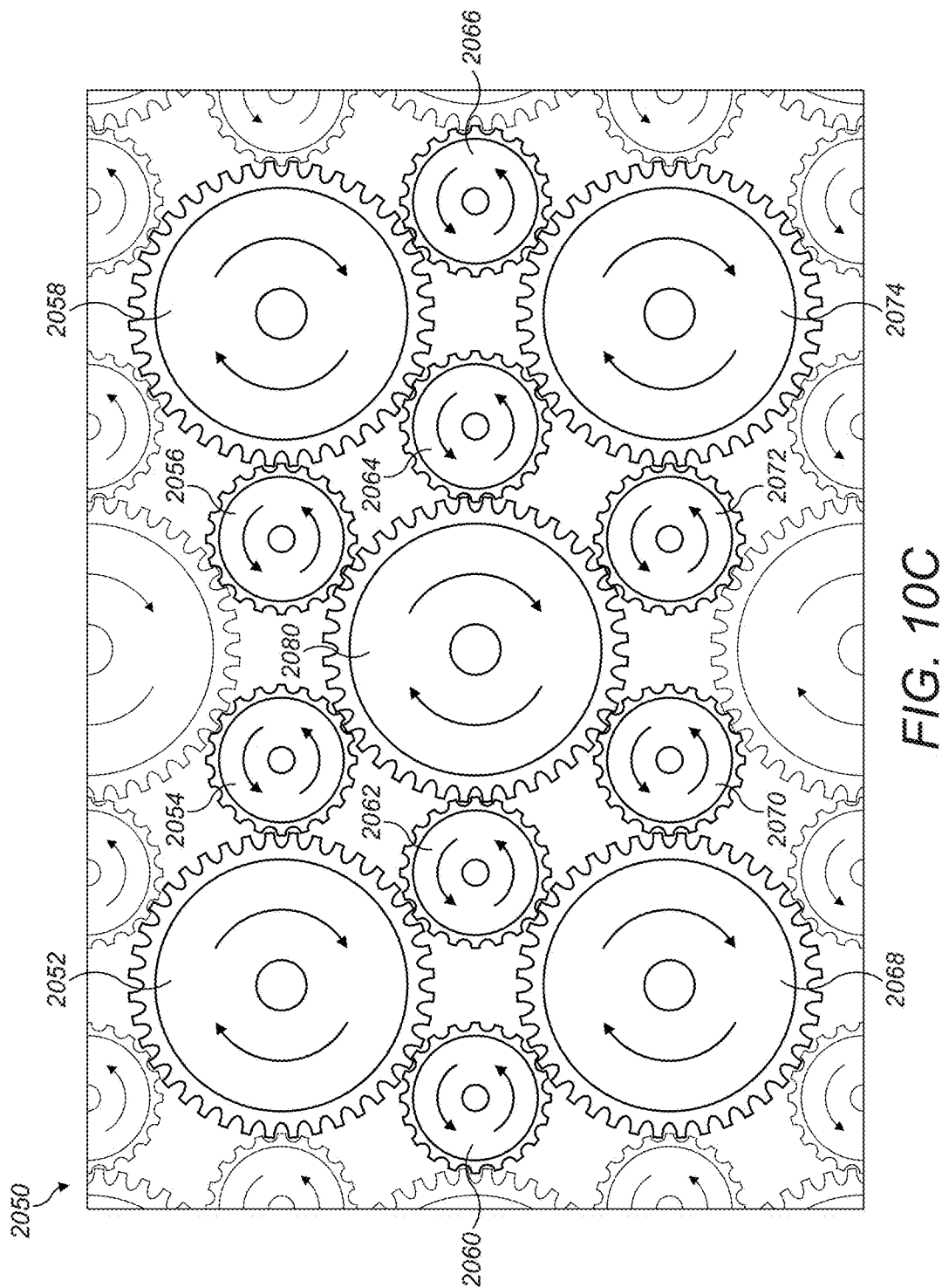

FIG. 10C shows a further configurations 2050 that tessellate two-dimensional space using larger interlocking gears 2052, 2058, 2068, 2074, 2080 and smaller interlocking gears 2054, 2056, 2060, 2062, 2064, 2066, 2070, 2072. This arrangement will operate properly if the circumferences of the larger interlocking gears 2052, 2058, 2068, 2074, 2080 and smaller interlocking gears 2054, 2056, 2060, 2062, 2064, 2066, 2070, 2072 have integer ratios. Further, the larger interlocking gears 2052, 2058, 2068, 2074, 2080 travel in opposite directions from smaller interlocking gears 2054, 2056, 2060, 2062, 2064, 2066, 2070, 2072.

The acoustic elements themselves are composed of a series of stationary teeth on the inner edge of the central spindle, and the rotating teeth structure moving with the mechanism around the outside. As the system rotates, the channel in which the acoustic waves can travel increase and decreases in length as well as changing in amplitude according to the meshing of the internal geometry of the meta-material with the static structure. This gives rise to changing phase and amplitude yielding the desirable properties of the time harmonic meta-material. This may also be achieved through a cam so designed as to have an effect similar to that of the teeth. The order of motion may also change in an implementation of this system; the inner spindle may be rotating while the outer part remains stationary.

Figure 11A:
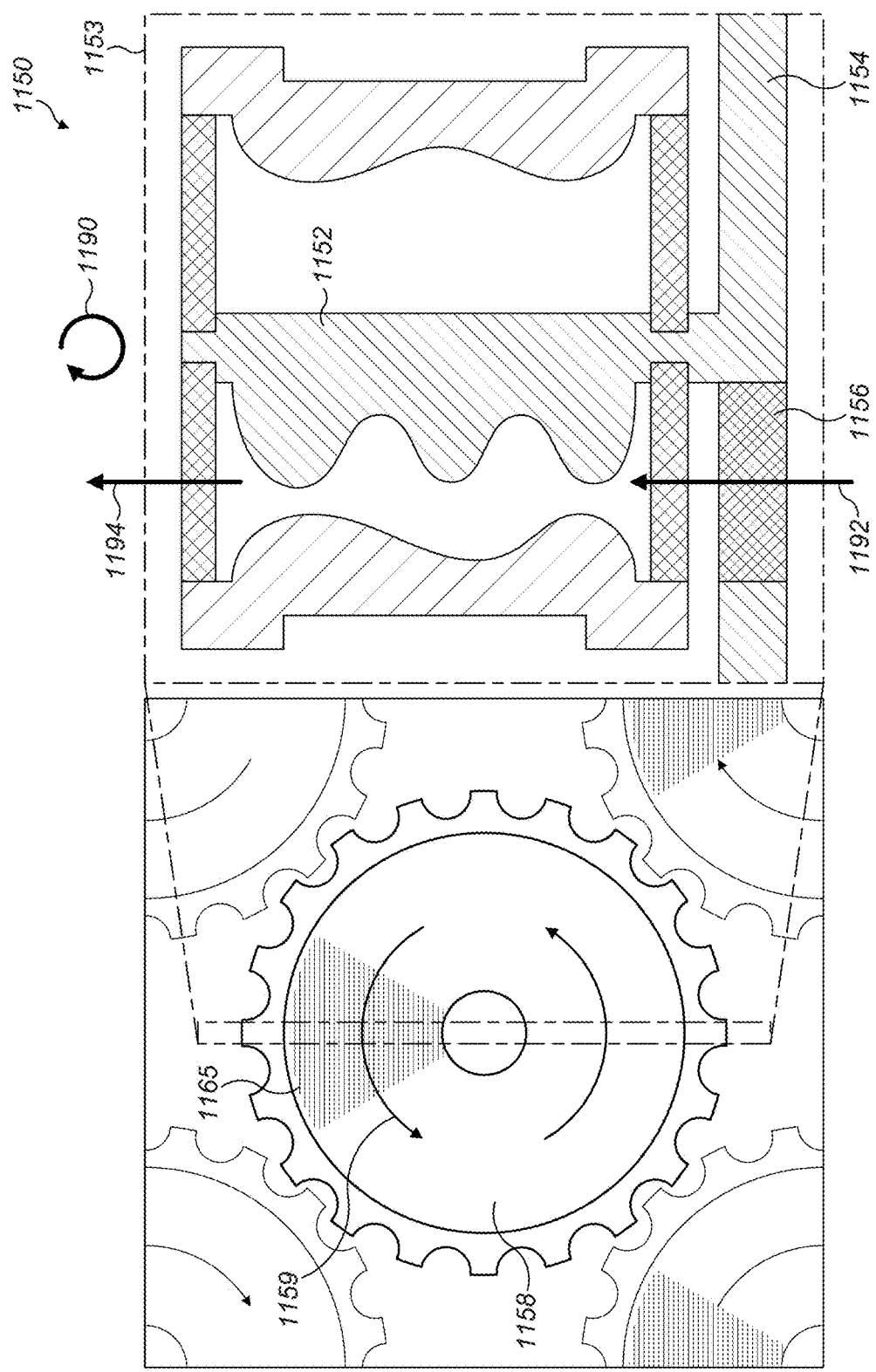
FIGS. 11A and 11B are cross-sections of a geared element showing an acoustic meta-material element, in accordance with some embodiments.

Shown in FIG. 11A is a diagram 1150 of a cross-section 1153 of geared element 1158 highlighting a stationary central spindle 1152 mounted on the common plate 1154 across the array. The acoustic waves travel 1192, 1194 adjacent to the highlighted standardized surface 1152 that the rotational element moves past via rotational movement 1159, 1190. This is designed to allow the rotating spindle options to deflect the acoustic waves differently using different patterns to produce a variety of phase and amplitude changes. The mesh 1165, 1156 is an optional acoustically transparent material.

Figure 11B:
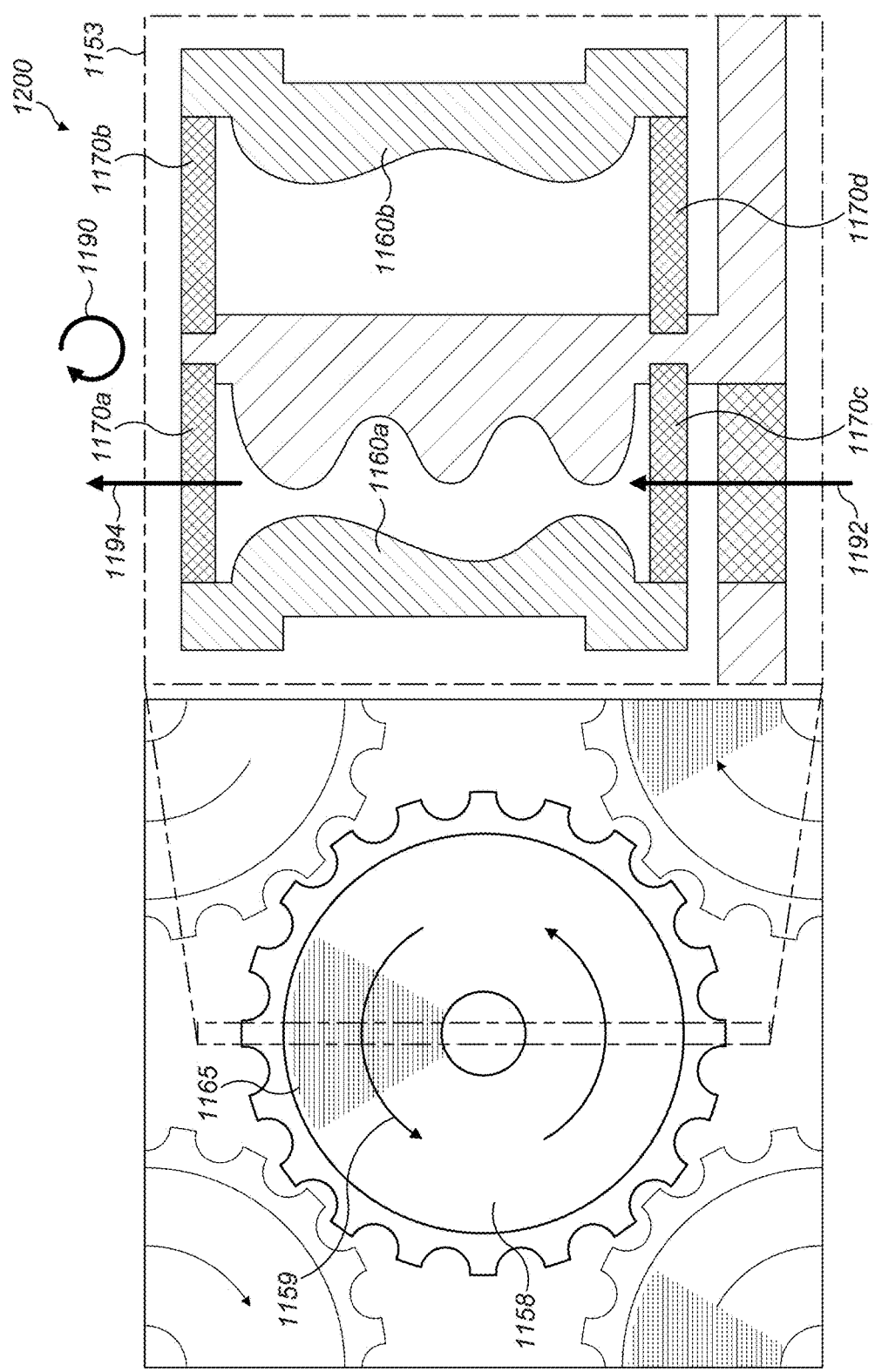

Shown in FIG. 11B is a diagram 1200 of a cross-section 1153 of a geared element 1158 highlighting outer meta-material structure 1160a, 1160b. The acoustic waves travel 1192, 1194 adjacent to the highlighted meta-material structures 1160a, 1160b that the rotational element moves past via rotational movement 1159, 1190. Each gear may have differently shaped meta-material structures 1160a, 1160b that serves to encode a meta-material surface In concert with the stationary inner edge, this provides a path for the acoustic waves that may be longer or shorter. Alternatively, this may attenuate the waves to produce known and controlled changes in phase and amplitude throughout the rotational period of this element. The mesh 1170a, 1170b, 1170c, 1170d shown is an optional acoustically transparent material that also functions as structural support in some embodiments.

Figure 12:
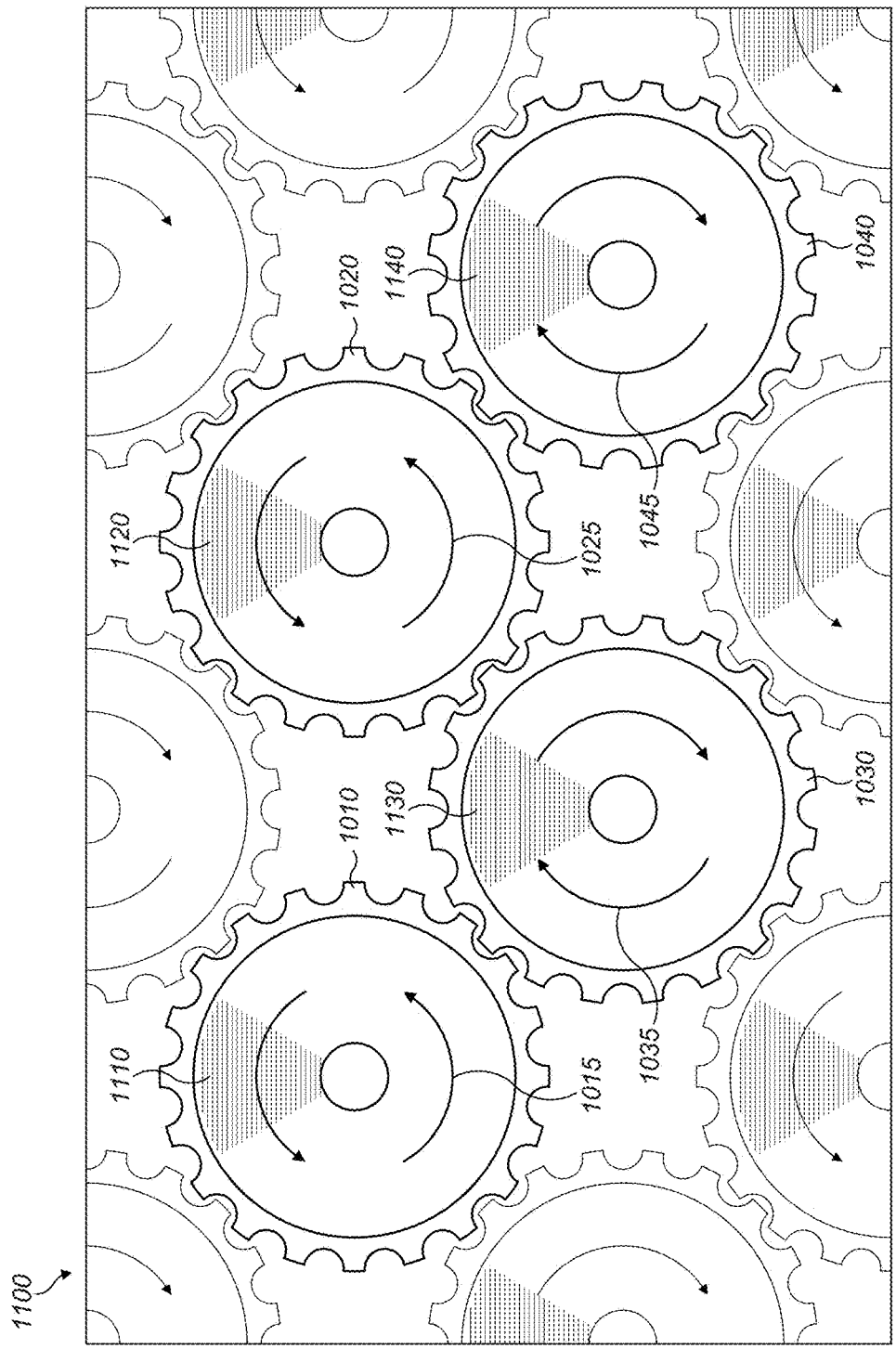
FIG. 12 is another series of interlocking geared elements designed to tessellate space, in accordance with some embodiments

Shown in FIG. 12 is the design 1100 of FIG. 10A, while also showing the open portions 1110, 1120, 1130, 1140 at the base of the structures 1010, 1020, 1030, 1040. As shown in FIGS. 11A and 11B, a monochromatic acoustic wave is intended to enter the meta-material, pass through the meta-material structure on the interior of the geared elements, and leaving the structure with a modified phase. The motion of the structure 1015, 1025, 1035, 1045 generates a small frequency shift in the acoustic wave which translates into the desired motion in the air. The system may use a larger or smaller opening depending on the permissible smoothing of the function of amplitude and phase. This is due to parts of the wave moving through meta-material structure intended for adjacent points of the function in time. While this appears to be a small opening, the meta-material may (due to the only requirement being a monochromatic input wave) be sitting on a reverberant cavity that does not permit the energy to leave except through the openings indicated.

Figure 13:
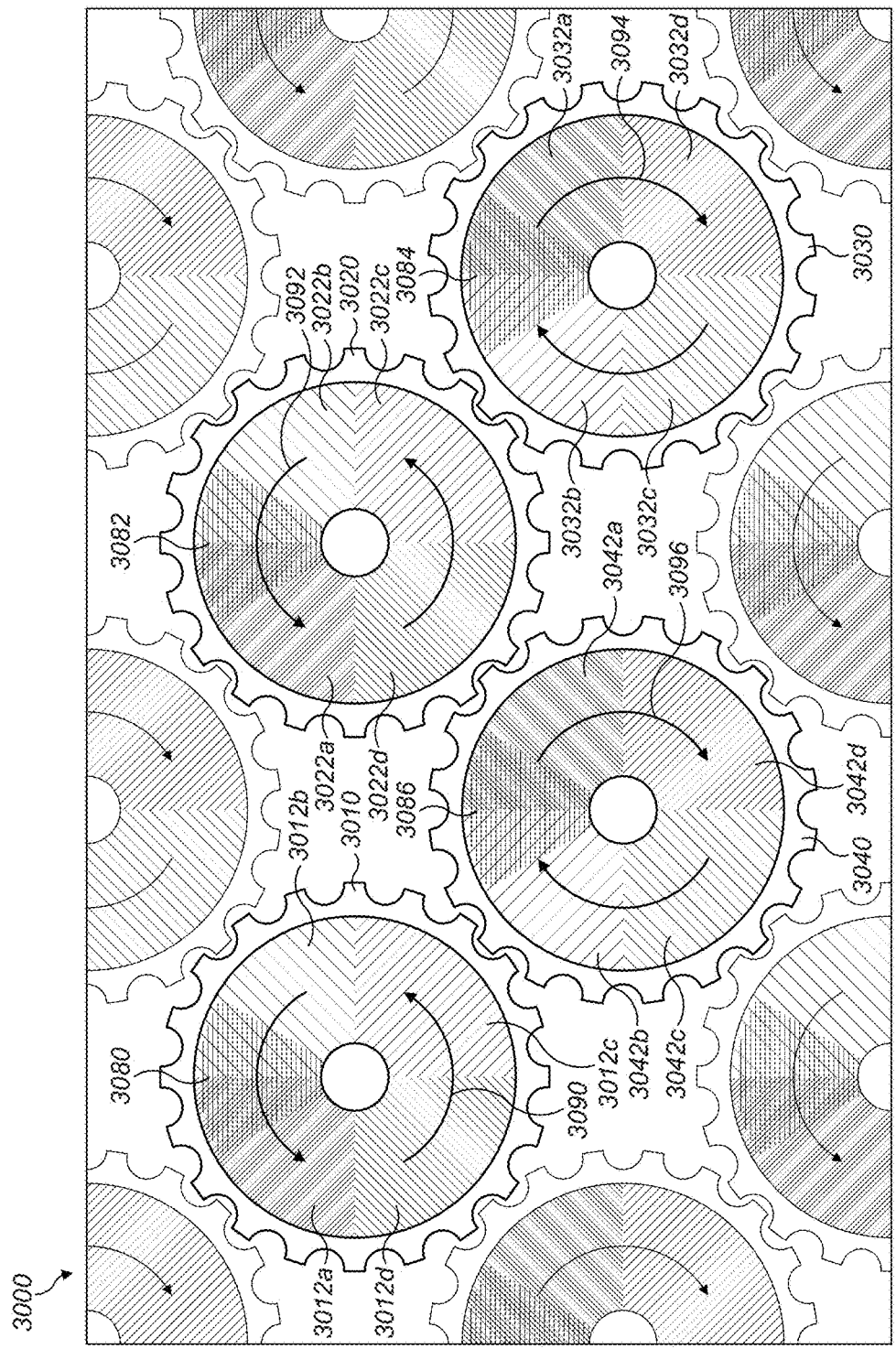
FIG. 13 is yet another series of interlocking geared elements designed to tessellate space, in accordance with some embodiments.

In FIG. 13, shown is a series 3000 of interlocking geared elements 3010, 3020, 3030, 3040 so designed as to tessellate space. Each of the geared elements 3010, 3020, 3030, 3040 have an opening 3080, 3082, 3084, 3086 for the monochromatic acoustic wave. The first geared element 3010 has four radial hatchings 3012a, 3012b, 3012c, 3012d, which corresponds to four different kinds of metamaterials to produce different parts of the harmonic period. The second geared element 3020 has four radial hatchings 3022a, 3022b, 3022c, 3022d, which corresponds to four different kinds of metamaterials to produce different parts of the harmonic period To produce a different part of the acoustic field in space, these may be different from the first geared element 3010. The third geared element 3030 has four radial hatchings 3032a, 3032b, 3032c, 3032d, which corresponds to four different kinds of metamaterials to produce different parts of the harmonic period. Again, to produce a different part of the acoustic field, these may be different from the first 3010 and second 3020 geared elements. The fourth geared element 3040 has four radial hatchings 3034a, 3034b, 3034c, 3034d, which corresponds to four different kinds of metamaterials to produce different parts of the harmonic period. As this is to produce a fourth part of the acoustic field differing spatially from any of the aforementioned, this may again result in a differing internal meta-material structure. Each of the first radial hatchings 3012a, 3022a, 3032a, 3042a of the four geared elements 3010, 3020, 3030, 3040 represent metamaterial structure whose structurally encoded phase and amplitude are substantially expressed as the resulting acoustic field at time $t_0+nT$. Each of the second radial hatchings 3012b, 3022b, 3032b, 3042b of the four geared elements 3010, 3020, 3030, 3040 represent metamaterial structure which is expressed at time $t_0+(n+\frac{1}{4})T$. Each of the third radial hatchings 3012c, 3022c, 3032c, 3042c of the four geared elements 3010, 3020, 3030, 3040 represent metamaterial structure expressed at time $t_0+(n+\frac{1}{2})T$. Each of the fourth radial hatchings 3012d, 3022d, 3032d, 3042d of the four geared elements 3010, 3020, 3030, 3040 represent metamaterial structure expressed at time $t_0+(n+\frac{3}{4})T$. In each case to represents a start time, T the period of each revolution of the gear structures and n any positive integer.

As the structure rotates, different portions of the prebuilt meta-material are exposed to the monochromatic acoustic source and therefore produce different effects that are periodic in time. In this structure, the first and second geared elements 3010, 3020 rotate counterclockwise 3090, 3092 and the third and fourth geared elements 3030, 3040 rotate clockwise 3094, 3096. Thus, the respective radial hatchings (and corresponding metamaterials) 3012a, 3012b, 3012c, 3012d of the first geared element 3010 and the radial hatchings (and corresponding metamaterials) 3022a, 3022b, 3022c, 3022d of the second geared element 3020 are placed in opposite order than the respective radial hatchings (and corresponding metamaterials) 3032a, 3032b, 3032c, 3032d of the third geared element 3030 and the radial hatchings (and corresponding metamaterials) 3042a, 3042b, 3042c, 3042d of the fourth geared element 3040.

Although four geared elements with four hatchings each are shown, there may be more or less geared elements and hatchings (and corresponding metamaterials) to produce a similar effect.

Figure 14A:
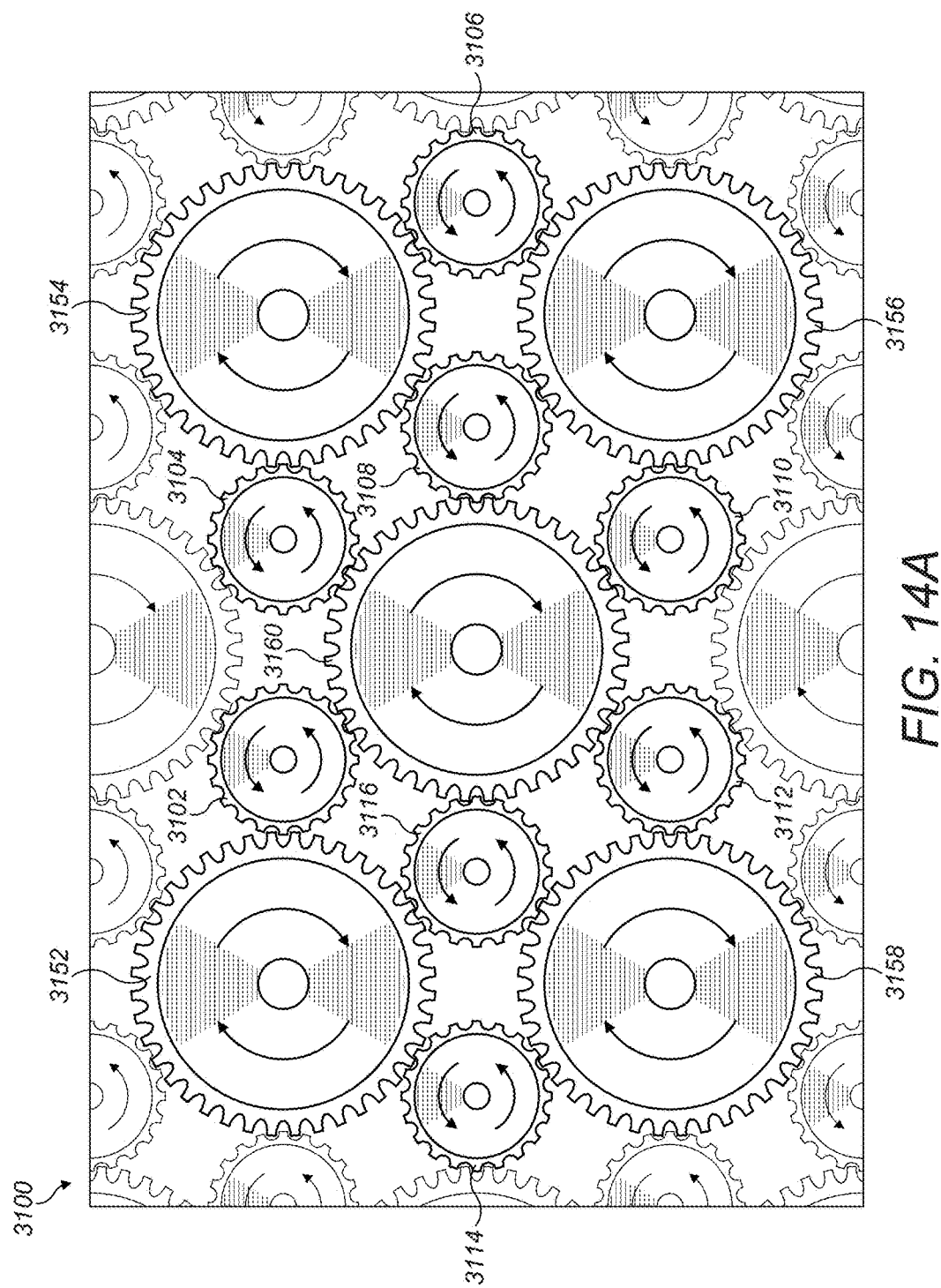
FIGS. 14A, 14B and 14C are yet another series of interlocking geared elements designed to tessellate space, in accordance with some embodiments

FIG. 14A shows a further configuration 3100 that tessellate two-dimensional space using larger interlocking gears 3152, 3154, 3156, 3158, 3160 and smaller interlocking gears 3102, 3104, 3106, 3108, 3110, 3112, 3114, 3116. In this example, the larger interlocking gears 3152, 3154, 3156, 3158, 3160 have twice the circumference of the smaller interlocking gears 3102, 3104, 3106, 3108, 3110, 3112, 3114, 3116.

Figure 14B:
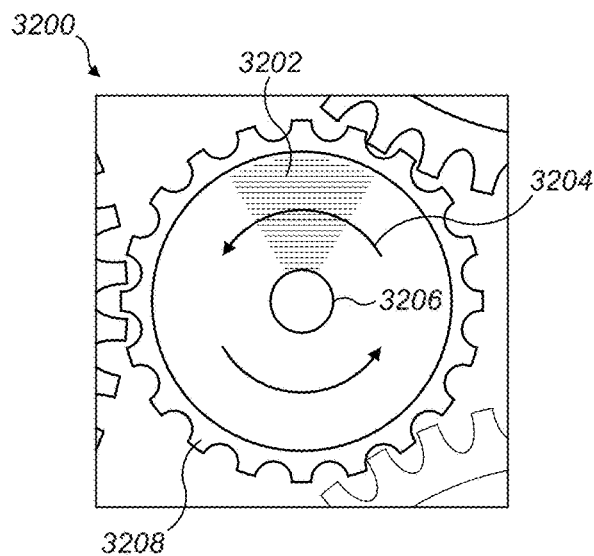
Figure 14C:
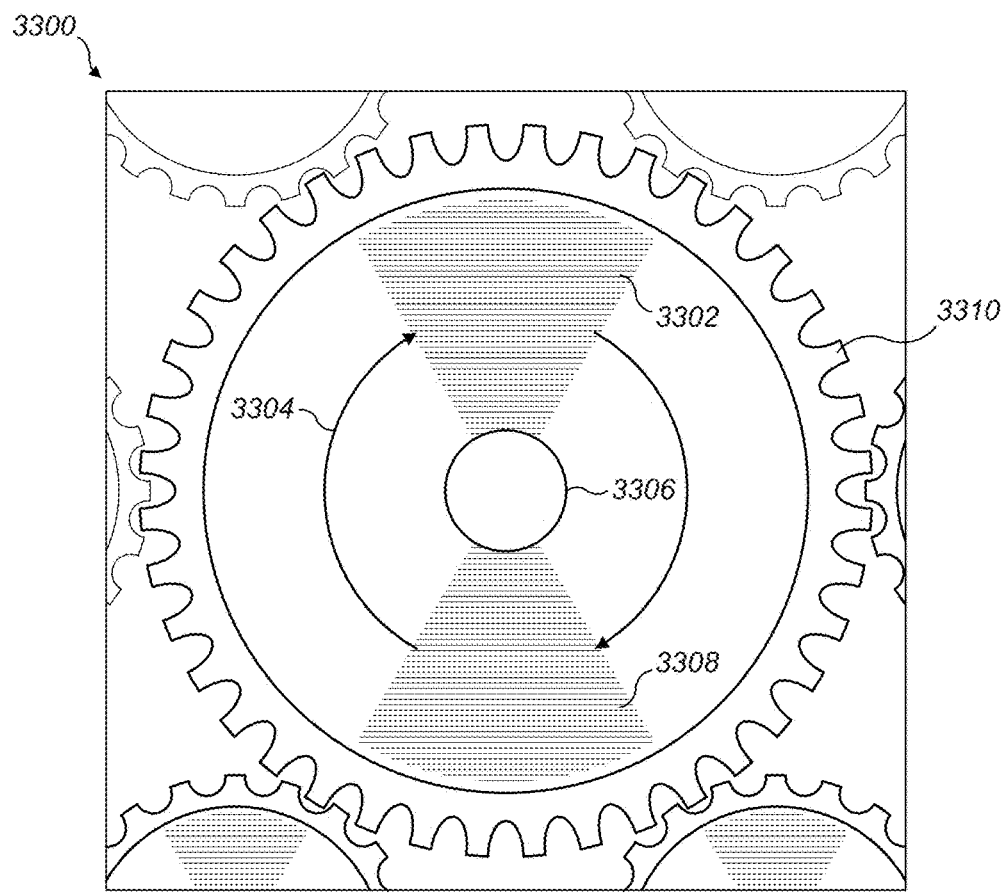

FIG. 14B shows a detail view 3200 of a typical smaller interlocking gear 3208. The smaller interlocking gear 3208 rotates counterclockwise 3204 about spindle or hub 3206 and has one acoustic opening 3202. In contrast, FIG. 14C shows a detail view 3300 of a typical large interlocking gear 3310. The larger interlocking gear 3110 rotates clockwise 3304 about spindle or hub 3306 and has two acoustic openings 3302, 3308. The goal of this arrangement is to have the same acoustic field to be generated by both gear types. Here, the angular velocity of the larger interlocking gear 3310 is halved (since it has twice the circumference of the smaller interlocking gear 3208). Accordingly, the larger interlocking gear 3310 has two acoustic openings 3302, 3306 while the smaller interlocking gear 3208 has one acoustic opening 3302.

Figure 15A:
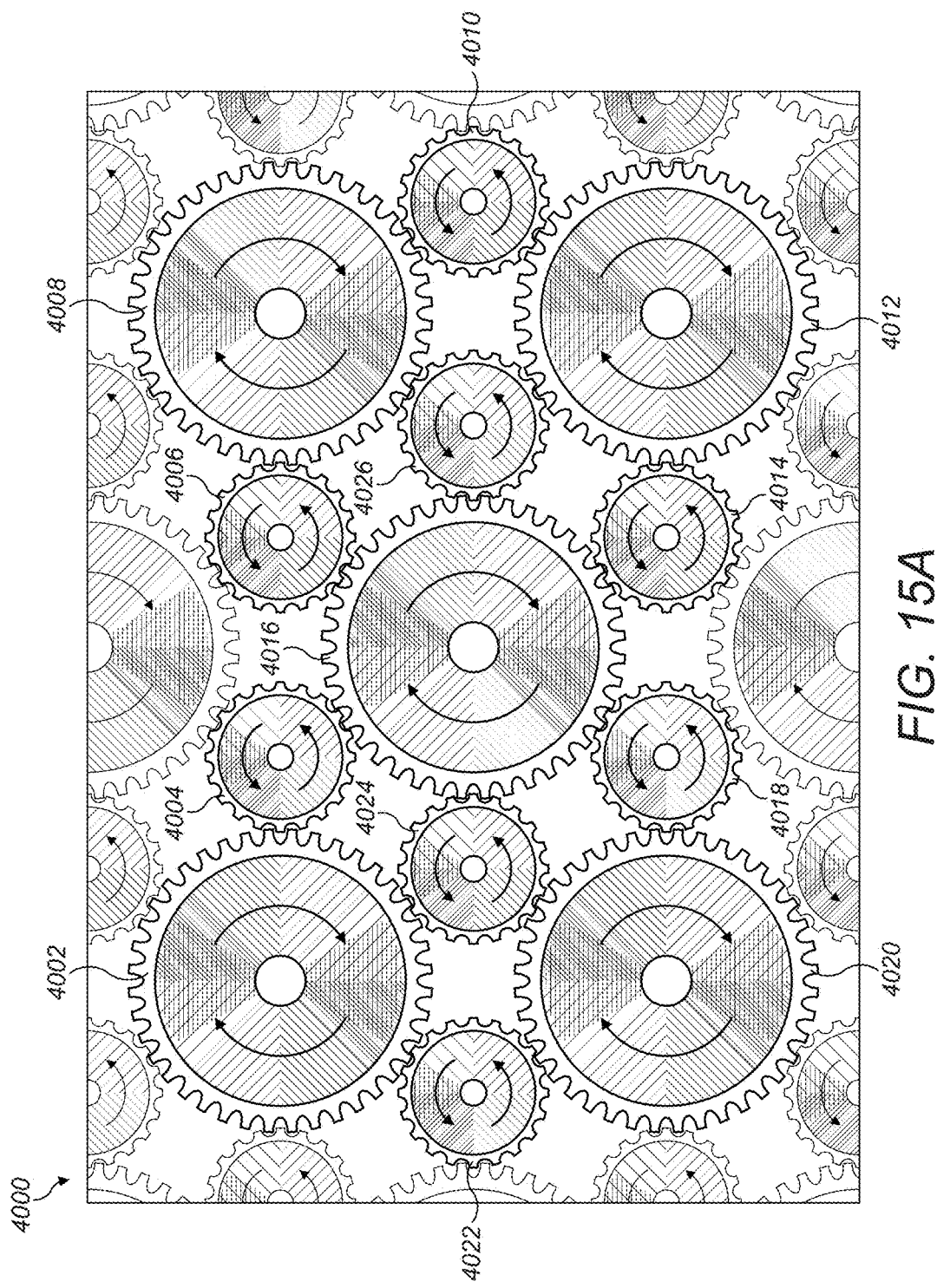
FIGS. 15A, 15B and 15C are yet another series of interlocking geared elements designed to tessellate space, in accordance with some embodiments.

FIG. 15A shows a further configuration 4000 that tessellate two-dimensional space using larger interlocking gears 4002, 4008, 4012, 4016, 4020 and smaller interlocking gears 4004, 4006, 4010, 4014, 4018, 4022, 4024, 4026. In this example, the larger interlocking gears 4002, 4008, 4012, 4016, 4020 have twice the circumference of the smaller interlocking gears 4004, 4006, 4010, 4014, 4018, 4022, 4024, 4026. Similar to FIG. 13, each of these interlocking gears incorporates radial hatchings (and corresponding metamaterials).

Figure 15B:
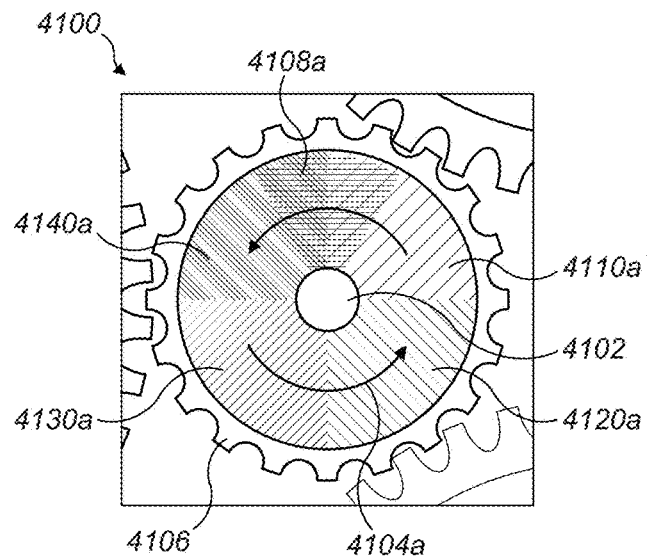
Figure 15C:
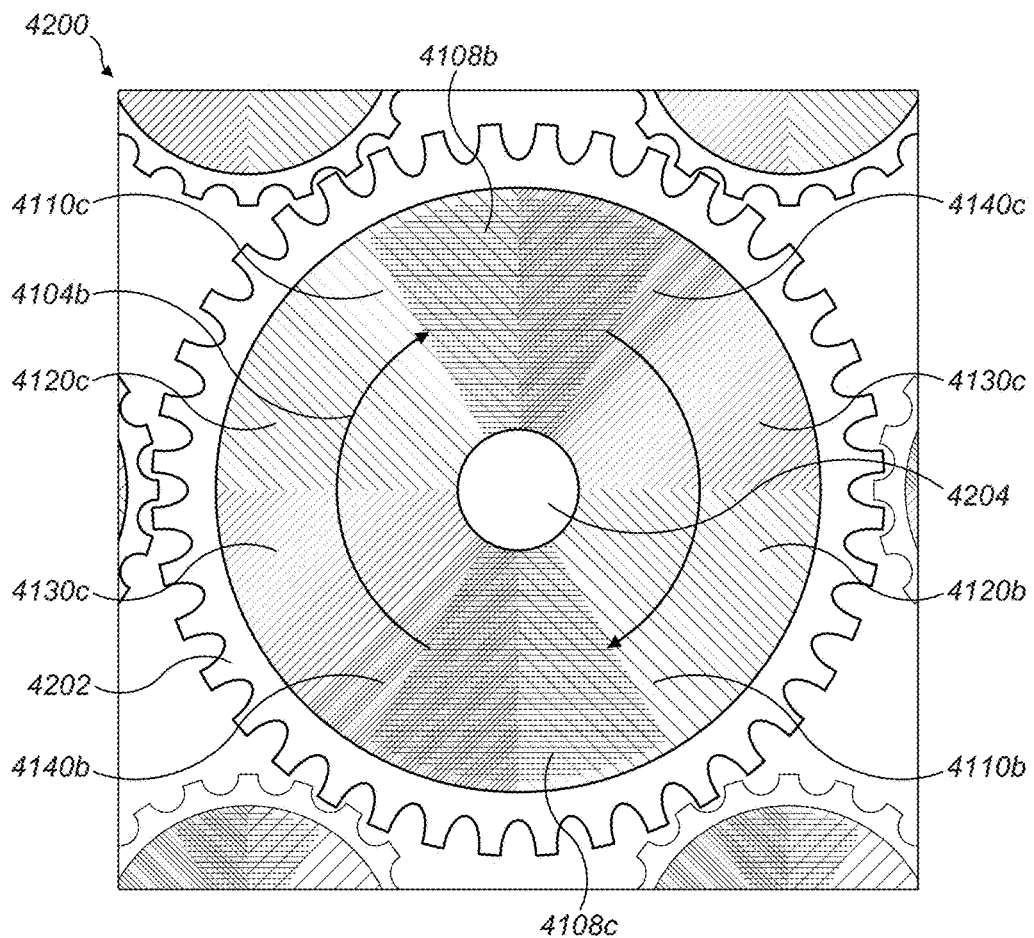

FIG. 15B shows a detail view 4100 of a typical smaller interlocking gear 4106. The smaller interlocking gear 4106 rotates counterclockwise 4104a about spindle or hub 4102 and has one acoustic opening 4108a. The small interlocking gear 4106 incorporates four radial hatchings (and corresponding metamaterials) 4110a, 4120a, 4130a, 4140a. In contrast, FIG. 14C shows a detail view 4200 of a typical large interlocking gear 4202. The larger interlocking gear 4202 rotates clockwise 4104b about spindle or hub 4204 and has two acoustic openings 4108b, 4108c. The larger interlocking gear 4202 incorporates four radial hatchings (and corresponding metamaterials), each of which is split into two parts 4110b, 4110c, 4120b, 4120c, 4130b, 4130c, 4140b, 4140c. This is because-unlike between individual gears-within this larger interlocking gear like radial hatching must substantially create a like acoustic field and therefore a like meta-material configuration.

The goal of this arrangement is to have synchronized contributions to the same acoustic field to be generated repeatedly by both gear types. Here, the angular velocity of the larger interlocking gear 4202 is halved (since it has twice the circumference of the smaller interlocking gear 4106). Accordingly, the larger interlocking gear 4202 has two acoustic openings 4108b, 4108c while the smaller interlocking gear 4106 has one acoustic opening 4108a.

Further, each of the radial hatching (and corresponding metamaterial) in the smaller interlocking gear 4106 has two counterparts on the larger interlocking gear 4202, each on opposite sides of the other. The first radial hatching (and corresponding metamaterial) 4110a in the smaller interlocking gear 4106 is different to, yet expressed at the same time as the two first radial hatchings 4110b, 4110c (and corresponding metamaterials) in the larger interlocking gear 4202, which belong to the same gear element and thus must be equivalent. The second radial hatching (and corresponding metamaterial) 4120a in the smaller interlocking gear 4106 is different to, yet expressed at the same time as the two second radial hatchings 4120b, 4120c (and corresponding metamaterials) in the larger interlocking gear 4202, which belong to the same gear element and thus must be equivalent. The third radial hatching (and corresponding metamaterial) 4130a in the smaller interlocking gear 4106 is different to, yet expressed at the same time as the two third radial hatchings 4130b, 4130c (and corresponding metamaterials) in the larger interlocking gear 4202, which belong to the same gear element and thus must be equivalent. The fourth radial hatching (and corresponding metamaterial) 4140a in the smaller interlocking gear 4106 is different to, yet expressed at the same time as the two fourth radial hatchings 4140b, 4140c (and corresponding metamaterials) in the larger interlocking gear 4202, which belong to the same gear element and thus must be equivalent.

Further, each of the radial hatching 4110a, 4120a, 4130a, 4140a (and corresponding metamaterial) in the smaller interlocking gear 4106 is laid out in a set order. The counterpart radial hatchings 4110b, 4110c, 4120b, 4120c, 4130b, 4130c, 4140b, 4140c on the larger interlocking gear 4202 (and corresponding metamaterial) are laid out in the opposite order. This is because the smaller interlocking gear 4106 rotates 4104a in one direction and the larger interlocking gear 4204 rotates in the opposite direction 4104b.

By setting up the larger interlocking gear 4202 and the smaller interlocking gear 4204 in this manner (and then generalizing this to all the gears in FIG. 15A), the same acoustic field may be contributed to by both gear types.

The foregoing embodiments may be generalized to any size gears with integer circumference ratios, any arrangement of such gears to tessellate space, and any amount of differing metamaterials.

V. Conclusion

The various features of the foregoing embodiments may be selected and combined to produce numerous variations of improved haptic systems.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
   generating a substantially monochromatic signal having a first phase and a first amplitude;
   transmitting the substantially monochromatic signal through a metamaterial system, wherein the metamaterial system has a plurality of structural elements defining a first elongated path through the metamaterial system and wherein the metamaterial system comprises stacked metamaterial layers and wherein the stacked metamaterial layers sample a curve in the complex plane;
   actuating the plurality of structural elements so as to define a second elongated path through the metamaterial system, wherein the second elongated path has a different length that the first elongated path;
   wherein the substantially monochromatic signal is transformed within the metamaterial system into a second signal having a second amplitude and a second phase.

2. The method as in claim 1, wherein the plurality of structural elements comprise teeth in a tortuous path design and wherein the second phase is different than the first phase.

3. The method as in claim 1, wherein the plurality of structural elements comprise layers of mesh and wherein the second amplitude is different than the first amplitude.

4. The method as in claim 1, wherein the change from the first amplitude to the second amplitude and the change from the first phase and the second phase are encoded in a complex phasor.

5. The method as in claim 1, wherein the metamaterial system comprises a Helmholtz resonator that is actuated by opening a hole in a chamber producing effectively an amplitude increase.

6. The method as in claim 1, wherein the stacked metamaterial layers sample the complex plane of phasors using a logarithmic spiral of coefficients reachable through digital control.

7. The method as in claim 1, wherein the stacked metamaterial layers conduct a sampling of the complex plane through an irrational step using the golden angle in order to find the most efficient packing of coefficients in the complex plane.

8. The method as in claim 1, wherein the second signal is focused at a control point to produce haptic effects.

9. The method as in claim 1, wherein the second signal is focused at a control point to produce parametric audio.

10. The method as in claim 1, wherein the second signal is focused at a control point to cause an object at the control point to levitate.

11. An apparatus comprising:
    a first rotating teeth structure comprising:
    a first spindle;
    a first rotating element having a first metamaterial cell, wherein the first metamaterial cell is capable of rotating about the first spindle in a first rotating direction;
    a first set of gear teeth at the circumference of the first rotating structure that is capable of rotating about the first spindle in a first rotating direction;
    a first opening in the first rotating element capable of transforming a monochromatic signal into a non-monochromatic signal while the first rotating element is rotating the first metamaterial cell.

12. The apparatus as in claim 11, further comprising:
    a second rotating teeth structure comprising:
    a second spindle;
    a second rotating element having a second metamaterial cell, wherein the second metamaterial cell is capable of rotating about the second spindle in a second rotating direction;
    a second set of gear teeth at the circumference of the second rotating structure that is capable of rotating about the second spindle in a second rotating direction;
    a second opening in the second rotating element capable of transforming a monochromatic signal into a non-monochromatic signal while the second rotating element is rotating the second metamaterial cell.

13. The apparatus as in claim 12, wherein the first set of gear teeth interface with the second set of gear teeth and wherein the first rotating direction is opposite to the second rotating direction.

14. The apparatus as in claim 13, further comprising a third opening in the second rotating element capable of transforming a monochromatic signal into a non-monochromatic signal while the second rotating element is rotating the second metamaterial cell;
    wherein the first rotating teeth structure is smaller than the second rotating teeth structure;
    and wherein the ratio of the circumference of the first rotating structure and the circumference of the second rotating structure is approximately an integer.

* * * * *